United States Patent [19]
Silver et al.

[11] Patent Number: 5,481,712
[45] Date of Patent: Jan. 2, 1996

[54] METHOD AND APPARATUS FOR INTERACTIVELY GENERATING A COMPUTER PROGRAM FOR MACHINE VISION ANALYSIS OF AN OBJECT

[75] Inventors: William M. Silver, Medfield; Samuel Druker, Brookline, both of Mass.; Philip Romanik, West Haven, Conn.; Carroll Arbogast, Needham, Mass.

[73] Assignee: Cognex Corporation, Natick, Mass.

[21] Appl. No.: 43,295

[22] Filed: Apr. 6, 1993

[51] Int. Cl.⁶ ........................................ G06F 9/44
[52] U.S. Cl. .................. 395/700; 395/161; 364/DIG. 1; 364/286.2; 364/286.3
[58] Field of Search .................... 395/700, 161, 395/158

[56] References Cited

U.S. PATENT DOCUMENTS

| | | | |
|---|---|---|---|
| 4,831,580 | 5/1989 | Yamada | 364/DIG. 2 |
| 5,287,449 | 2/1994 | Kojima | 395/161 |

OTHER PUBLICATIONS

Medina–Mora et al. (1981) *An Incremental Programming Environment*, IEEE Transactions on Software Eng. SE–7:472–482.

Teitelbaum et al. (1981) *The Cornell Program Synthesizer: A Syntax–Directed Programming Environment*, Communications of the ACM 24:563–573.

*Primary Examiner*—Thomas M. Heckler
*Attorney, Agent, or Firm*—Choate, Hall & Stewart

[57] ABSTRACT

A system for interactively generating a computer program for machine vision analysis insures that the program is correct by permitting the operator to make only syntactically correct modifications to the program. The system includes an element for storing the computer program being generated. A further element displays the program to the operator. A positioning element demarks a location of interest within the program. A menu element displays permissible programming modifications for the location of interest. The menu element incorporates in its display of permissible programming modifications statements for machine vision analysis of an object image, e.g., calls to machine vision subroutines and functions. To facilitate specification of input parameters to those subroutines and functions, the imaging element can generate a candidate image of the object upon which the machine vision analysis is to be run. A graphical input element displays over that candidate image a graphical icon that the operator can manipulate to specify the parameters. A textual input element can display an icon, e.g., a dialog box, prompting the operator to designate textually input parameters for the machine vision tool. An update element responds to the operator selection by appropriately modifying the stored program.

34 Claims, 3 Drawing Sheets

METHOD AND APPARATUS FOR INTERACTIVELY GENERATING A COMPUTER PROGRAM FOR MACHINE VISION ANALYSIS OF AN OBJECT

BACKGROUND

This invention relates generally to machine vision and, more particularly, to programming digital data processing systems for machine vision analysis of images.

Prior art machine vision systems may be classified as either special-purpose systems or development systems. Special-purpose systems perform specific machine vision analyses, such as, verifying the contents of a label on a package. They are typically deployed on-site, e.g., at the factory floor, for use by shop personnel during the manufacturing process.

Development machine vision systems, on the other hand, typically comprise a collection of software "tools" that can be arranged to perform many machine vision functions. These systems may include, for example, software subroutines for identifying the center of mass of an object or for detecting the edge of an object. Development systems are typically used by vision system manufacturers (e.g., OEM's and VAR's) to develop special-purpose machine vision systems for use by their customers.

A drawback of the special-purpose systems is their relative inflexibility. While they typically permit an operator to specify limited information about an object to be inspected, they cannot be adapted to provide new vision functions. Thus, prior to a production run, an operator may input into a special-purpose label verification system the content of labels to be inspected. However, the operator could not readily modify such a system, for example, to verify that a one-time promotional coupon was affixed to the label.

Notwithstanding their added flexibility, a drawback of traditional development systems is that they are difficult to use. The software tools employed by the development system must be selected and incorporated into a computer program in order to perform useful vision analyses. This typically requires solid computer programming skills and a thorough knowledge of the vision analysis to be performed, as well as familiarity with the computer hardware and operating system on which that analysis will be run.

In view of the foregoing, an object of the invention is to provide improved methods and apparatus for machine vision and, more particularly, for programming digital data processing systems for machine vision analysis of images.

Another object of the invention is to provide a system for machine vision analysis with greater flexibility than conventional special-purpose machine visions systems.

Still another object is to provide methods and apparatus for machine vision analysis that are capable of handling a wide variety of machine vision tasks and, yet, do not require an in-depth knowledge of computer programming, nor of computer hardware and operating systems.

Other general and more specific objects of this invention will in part be obvious and evident from the description and drawings which follow.

SUMMARY OF THE INVENTION

The aforementioned and other objects are achieved by the invention which provides, in one aspect, an apparatus for interactively generating a computer program for machine vision analysis. The apparatus insures that the program is correct by permitting the operator to make only syntactically correct modifications to the program.

According to this aspect, the apparatus includes an element for storing the computer program being generated. A further element, coupled to the program store, displays the program to the operator. A positioning element demarks a location of interest within the program. That location may be at the end of the program, the beginning of the program, or at any other point where the operator intends to make modifications.

A menu element displays to the operator permissible programming modifications for the location of interest. For example, if the specified location is an entire if . . . then . . . endif construct (e.g., a block of code beginning with an if . . . then statement and ending with an endif statement), the menu element may enable the DELETE function, thereby, permitting the operator to strike the entire construct. On the other hand, if the specified location is the single word endif, the DELETE function is disabled, thereby preventing the operator from invalidating the language construct.

An update element responds to the operator selection by appropriately modifying the stored program.

According to another aspect of the invention, the menu element displays, as permissible programming modifications, syntactically correct programming statements that the operator may insert into the program. Continuing with the example, if the specified location is within an if . . . then . . . endif construct, the menu element displays the else statement, thereby permitting the operator to add the statement to the program. If the specified location lies outside of the if . . . then . . . endif construct, the menu element disables the else statement, thereby preventing the operator from impermissibly adding the statement at the specified location.

In a related aspect of the invention, the menu element incorporates in its display of syntactically correct programming statements, statements for machine vision analysis of an object image. Those statement can be, for example, subroutines or functions for invoking a machine vision tools (e.g., for identifying the center of mass of an object or for detecting the edge of an object in an image) that require input parameters (e.g., for specifying the expected location of the object).

To facilitate specification of those input parameters, an imaging element can generate a candidate image of the object upon which the machine vision analysis is to be rim. In this regard, the operator can place within the field of view of a camera, that is coupled to the imaging element, a sample of the object which is to be analyzed. A graphical input element displays over that candidate image a graphical icon that the operator can manipulate to specify the parameters.

Continuing with the example, in order to facilitate specification of the expected location of an object, the graphical input element can display a cross-hair or marquee box on the candidate image. The operator can position (and size) that icon so as to designate the expected location. The update element modifies the stored program accordingly by supplying that information (along with any other designated input parameters) to the machine vision analysis tool, e.g., by way of parameters in a subroutine or function call.

In a related aspect, a textual input element can display an icon prompting the operator to designate textually input parameters for the machine vision tool. That icon can be, for example, a "dialog" box.

The invention provides, in a still further related aspects, a run-time element that executes the program and invokes the selected machine vision analysis tool using the input parameters specified by the operator, e.g., via the text and graphical inputs.

Other aspects of the invention include methods paralleling the operation of the apparatus described above. These and other aspects of the invention are evident in the drawings and in the detailed description which follows.

BRIEF DESCRIPTION OF THE DRAWINGS

The foregoing and other aspects of the invention may be more fully understood from the following description, when read together with the accompanying drawings in which.

DETAILED DESCRIPTION OF THE ILLUSTRATED EMBODIMENT

Figure 1:
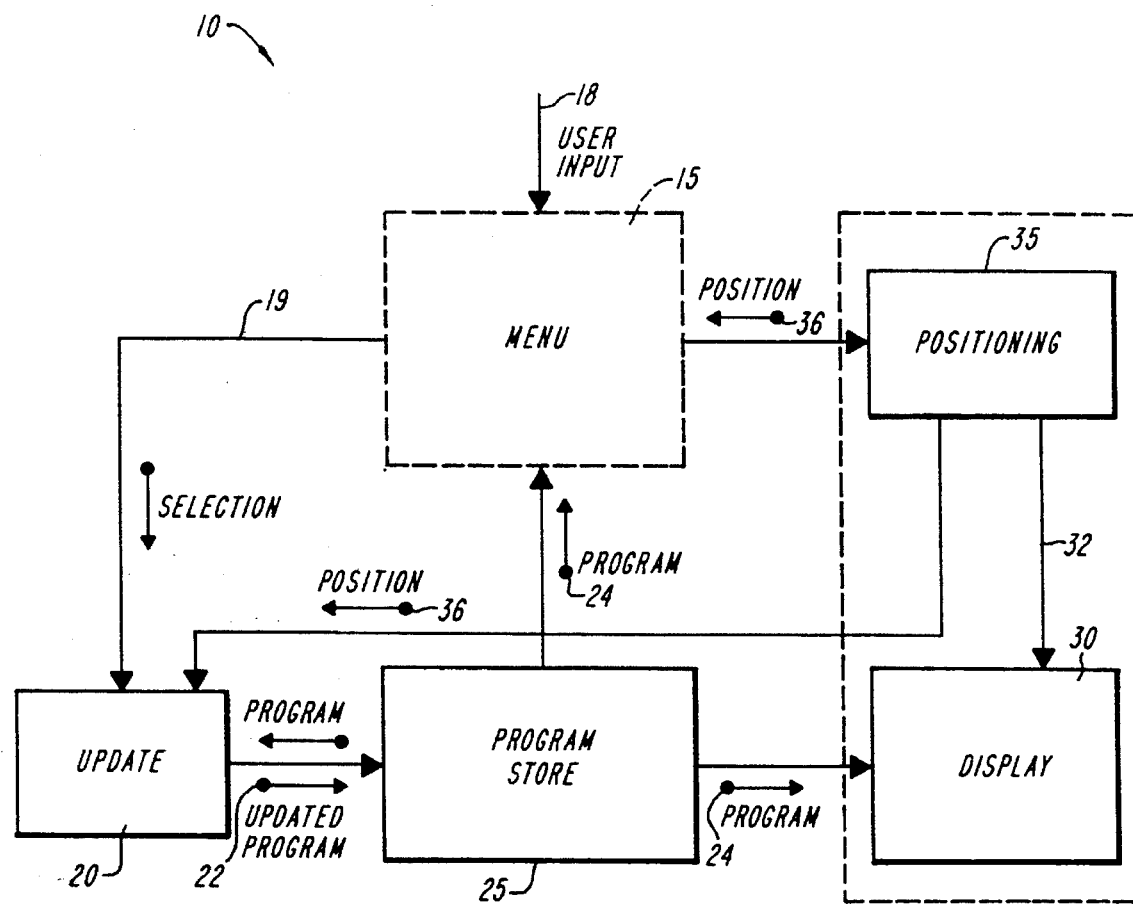
FIG. 1 depicts a preferred embodiment of the interactive programming environment of the present invention.

FIG. 1 depicts the interactive programming system 10 according to a preferred embodiment of the invention. The system 10 includes a menu 15, an update element 20, a program storage element 25, a display element 30, and a positioning element 35, connected as shown.

The program storage element 25 stores a computer program created by a system operator in an intermediate syntactically correct form, e.g., a parse tree. In a preferred embodiment, the program storage element contains free memory space specifically allocated for storing the computer program.

The display element 30 graphically displays the computer program to the system operator. Thus, the display 30 includes an element (not shown) for translating the parse tree stored in the program storage element 25 into a human readable text and, more preferably, into the format of a high-level computer language, e.g., FORTRAN or C.

The position element 35 demarks the system operator's location within the computer program being generated. A position icon, e.g., a I-bar, is generated by the position element 35 to provide a visual aid in showing the position of interest. Preferably, the operator specifies that position of interest via an input device such as a keyboard, mouse or trackball.

The menu element 15 graphically displays a list of permissible programming modifications. The programming modifications are syntactically correct—that is, they include additions or deletions that insure that the program contains proper language constructs. In a preferred embodiment, the permissible programming modifications include permissible additions, deletions and other modifications of the program. The additions, themselves, include programming statements, e.g., commands, declarations, subroutines and functions and function calls. The preferred illustrated embodiment is intended for use in generating computer programs for machine vision analysis and, accordingly, specifically includes programming statements, e.g., subroutine and function calls, for invoking machine vision tools. The menu 15 accepts responds to an operator's selection of a modification by generating a selection signal 19.

The update element 20, responds to the selection signal 19, by making the corresponding modification to the program stored in the program storage element 25. Preferably, as noted above, the program is stored in intermediate code form and, accordingly, the update element includes an intermediate code generator for generating the modified program in a syntactically correct intermediate form.

Figure 2:
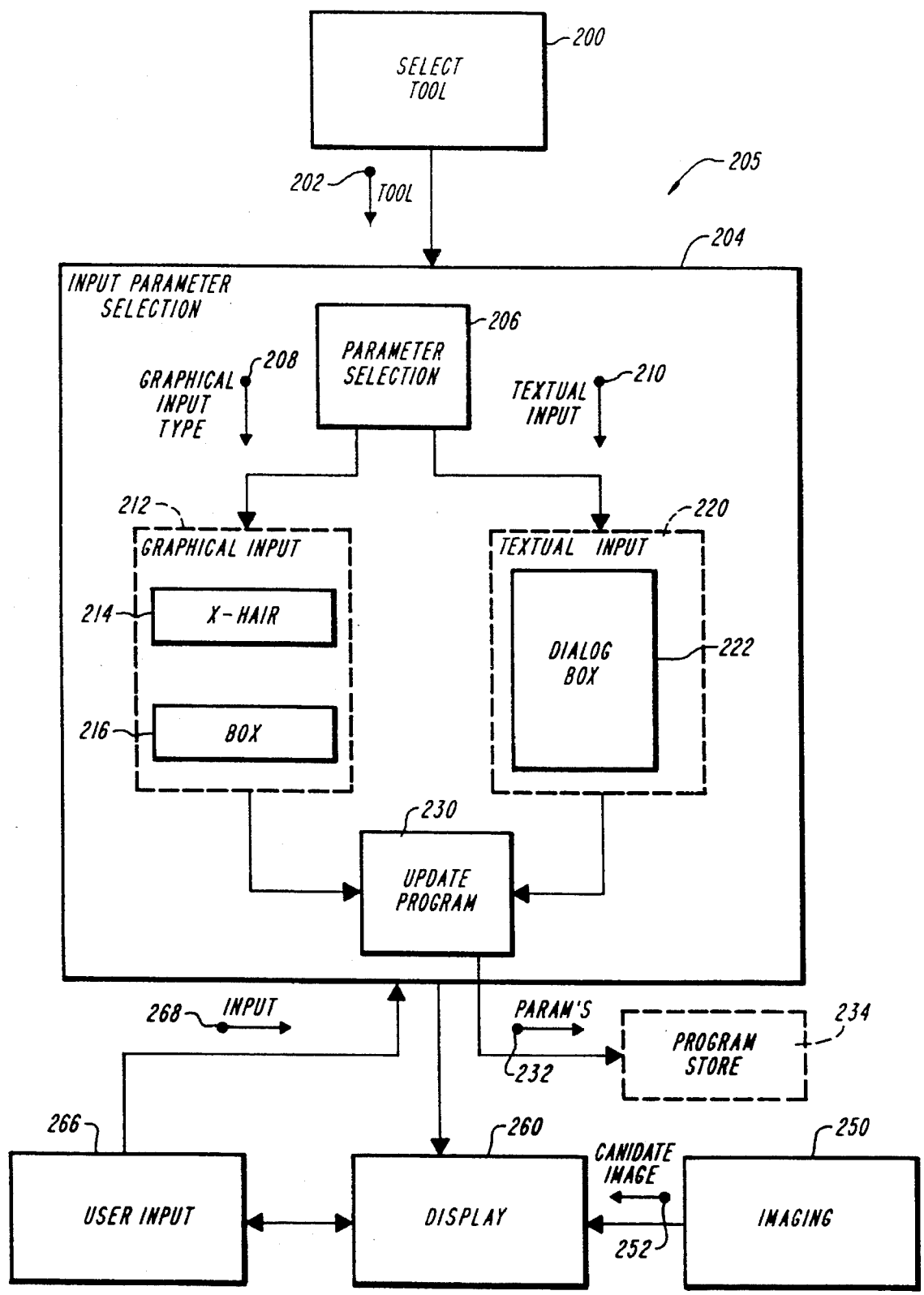
FIG. 2 depicts the operator interfacing system according to a preferred embodiment of the invention.

FIG. 2 depicts a preferred system 205 according to the invention for facilitating specification of input parameters to machine vision analysis tool calls (i.e., function and subroutine calls). The system 205 includes a selection element 200, an input parameter element 204, an imaging element 250, a display element 260, and a operator input 266, connected as shown. The input parameter element 204 includes a parameter selection element 206, a graphical input element 212, a textual input element 220, and an update program storage element 230, also connected as shown.

The selection element 200 allows the system operator to select a specific machine vision tool to be invoked by the above generated computer program. The selected machine vision tool preferably requires one or more input parameters, e.g., image location.

The imaging element 250 generates a candidate image of an object upon which a machine vision analysis tool is to operate. The imaging element comprises any means for generating a digital image of a operator inputted object. For example, a typical digital imaging system includes a camera with a selected field of view into which a candidate object is inserted, and a digitizer which generates the digital object image. The digitizer and camera assembly can be of conventional construction and design and of a type that is commonly available.

The input parameter selection 204 generates the input parameters required by the selected machine vision tool. The input element features several elements including the parameter selection element 206. The parameter selection element 206 determines the mode, either graphical or textual, in which the input parameters are supplied to the selected machine vision tool. Thus, when the input parameters are amenable to specification in a a graphical input display mode, the parameter selection element 206 obtains the parameters graphically from the operator. And, when the input parameters are amenable to specification in a textual input display mode, the parameter selection element 206 obtains them textually. Those skilled in the art will, of course, appreciate that most input parameters can be obtained textually, while fewer are readily amenable to graphical input.

The display element 260 displays the candidate image generated by the imaging element 250. The operator input element 266 communicates with the display element 260 for obtaining the operator-specified input. The display element and operator input element can be constructed from conventional computer, monitor and input devices (e.g., keyboard, mouse or trackball). Preferably, those elements are corresponding elements of the machine vision equipment sold by the assignee hereof under the CHECKPOINT 2000, CHECKPOINT 3000 and CHECKPOINT 4000 trademarks.

The graphical input element 212 responds to the graphical input signal 208 to displays, in connection with the generated candidate image, a manipulable graphical icon. In a preferred embodiment, the manipulable graphical icon is a cross hair 214 and a marquee/box 216 though, of course, other icons can readily be used. The system of the present invention operates such that the designated graphical input selection is superimposed over the candidate image displayed by the display element 260. It is readily recognizable by one of ordinary skill in the art that the graphical input icons 214, 216 can be superimposed over a real-time candidate image or a stored candidate image. The display element 260 displays the image over which the operator may graphically write selected graphical data.

The textual input element 220 responds to the graphical input signal 210 to displays a manipulable textual icon, e.g., a dialog box 222. The dialog box 222 allows the system operator to textually specify the input parameters required by the selected machine vision tool.

The graphical input element 212 and the textual input element 220 are coupled to the update program element 230. The update element 230 generates a program signal representative of at least a portion of the computer program being generated, particularly, that portion corresponding to invocation of the selected machine tool and specification of input parameters for that tool.

In operation, the computer program being generated by the system operator, as illustrated in FIG. 1, typically includes one or more programming statements containing a call to a machine vision analysis tool. Typically, such a tools requires specification of input parameters determining how the tool is to conduct its analysis.

In order to facilitate specification of those parameters, a candidate object image generated by the imaging element 250 is displayed on the display element 260. Once the machine vision tool is selected, as defined via the tool signal 202, the parameter selection element 206 determines the permissible mode(s) in which the input parameters can be supplied.

When the input parameter is amenable to graphical input, the graphical input element 212 superimposes a manipulable graphical icon over the object image displayed by the display element 260. The operator then specifies the necessary parameters via the operator input element 266 by manipulating the graphical icon.

By way of example, when the operator includes in the program a call to the LINE FINDER machine vision tool (for identifying the location of a line in an image), the system 205 facilitates designation of a portion of image in which that tool is to operate. For this purpose, the graphical input element 212 superimposes a manipulable marquee/box over the candidate image, thereby permitting the operator to designate the region of interest. Similarly, the textual input element 220 can be deployed to display a dialog box 222, permitting the operator to enter the coordinates of the region of interest.

Once the operator has specified the input parameters, the update element 230 generates modifies the stored program to include in the call to the requested machine vision tool, e.g., LINE FINDER, the designated input parameters.

Figure 3:
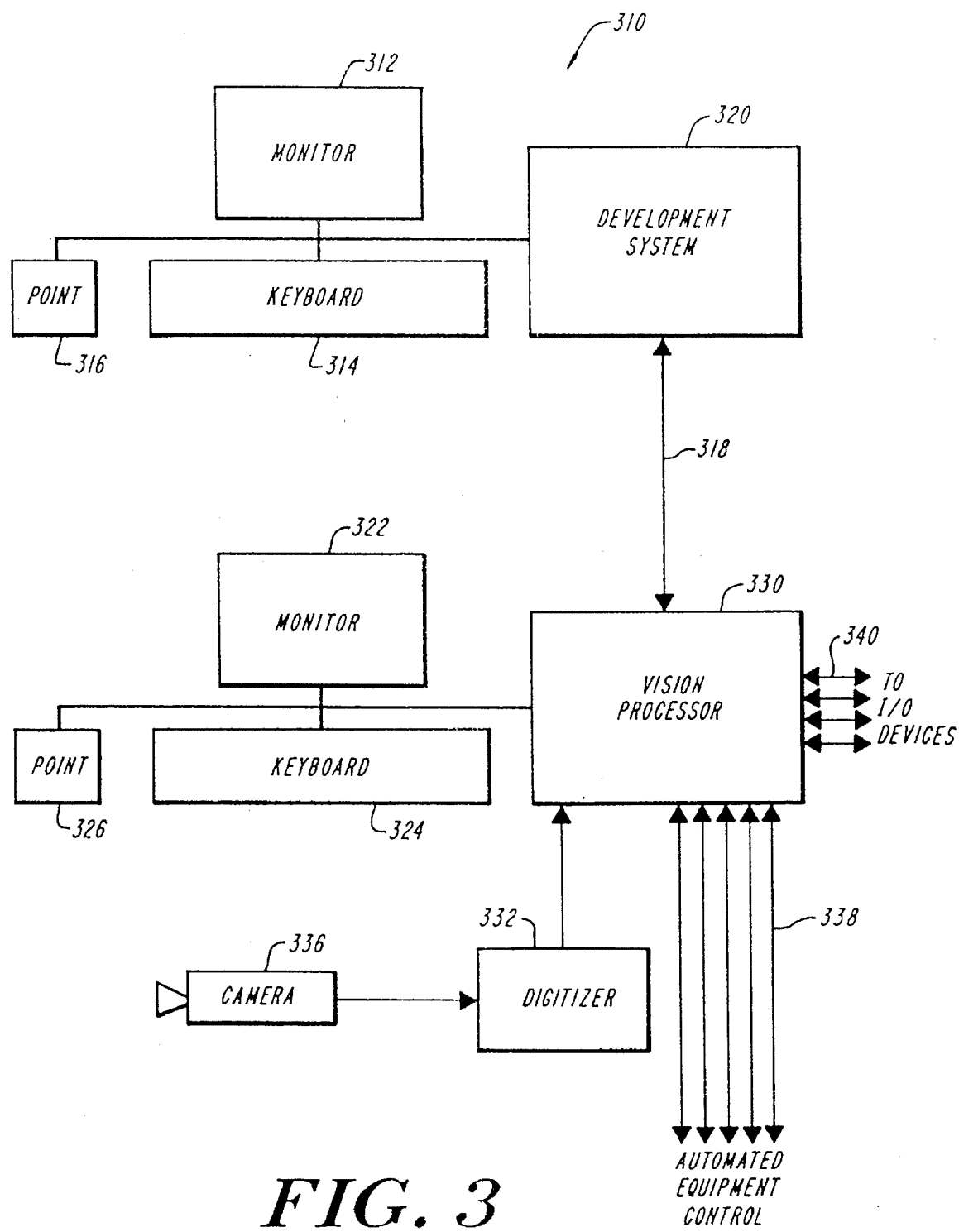
FIG. 3 depicts a schematic block diagram of a preferred hardware system according to the invention.

FIG. 3 depicts the hardware system 310 according to a preferred embodiment of the invention. A development system 320 has an associated monitor 3 12, a keyboard 314, and a pointer 316. Likewise, a Vision Processor 330 has an associated monitor 322, a keyboard 324 and a pointer 326. The system further includes a camera 336, a digitizer 332, and connections to separate I/O devices and Automated Equipment Control.

The Vision Processor 330 (VP) is preferably responsible for the dedicated processing of the machine vision tool software and factory floor automation control equipment. The development system 320 (DP) is preferably responsible for the application development interface and all activities relating to design of the application. In a preferred embodiment, the development system 320 communicates with the Vision Processor 330 via data pathway 318. Preferably, the Development System (DS) and is always assumed to have a VP connected to it.

The Development System 320 is preferably a commonly available PC running an MS Windows (version 3.1) operating system. The VP 330 can be any conventional computer-controlled machine vision apparatus including machine tools systems, such as systems sold by Allen-Bradley and AISI (Applied Intelligent Systems, Inc.) A preferred such system is that sold by the assignee hereof under the tradenames CHECKPOINT 2000, CHECKPOINT 3000 and CHECKPOINT 4000.

Referring again to FIG. 3, the VP 330 has connections 338, 340 for interfacing to a camera, a monitor, external I/O devices, pointing devices, and discrete I/O signals for control of automation equipment. The DS 320 encompasses the interactive programming environment as illustrated in FIG. 1, and the VP 330 embodies the program operator interfacing system depicted in FIG. 2.

The development system 320 includes the main computing entities, such as a programming panel and one or more machine vision tool dialog boxes (not shown). The tool dialogs contain information about the static state and initialization of the tools displayed in the VP 330. In a preferred embodiment, the operator can double click vision tools on the VP monitor 322 to allow operator access to these dialogs. Initial or input parameters, such as the confusion threshold, the score threshold, and the tolerance levels for a search point can be adjusted via operator input. Access is implemented with specialized import/export methods in the classes for machine vision tools. Preferably each dialog is customized to the a operator selected machine vision tool. For example, the dialog for a light probe tool can display a histogram of the light levels in its region of interest.

The DS 320 is preferably implemented in the Microsoft Visual Basic development environment. Basic module libraries are capable of handling low level routines such as serial communication, symbol table manipulation, expression parsing, file input-output, sexps, and event interfacing with the VP 330.

The programming panel is the heart of the operator's application development. The panel displays a buffer of text that shows the operator the result of his interaction with the programming environment, together with one or more displays of variables which can be displayed by the monitor 312. Thus, when the operator selects a machine vision tool (through a menu choice), the DS 320 sends a request via data pathway 318 to the VP 330 for its creation, records the information that results from that creation, and gives the tool a default name so it can be listed in the variables display. Alternatively, the development system 320 creates the selected machine vision tool, records the information that results from that selection and then transmits the generated data along the data pathway 318 to the VP 330. The machine vision tool name can then be edited and all displays are automatically updated to show the new name of the tool. A statement is inserted in the application that "runs" the tool.

The system 310 further allows the operator to control the course of action of the application by reordering the statements representing the run actions of the tools. The programming panel displayed on the monitor 312 provides one or more statements to enable the system operator to control the above sequence of events and to extract runtime data from the machine vision tool. In a preferred embodiment of the invention, the programming statements include the following: call, calculate, set, if, elseif, else, while, for, break, next, goto, label, define, call, and return. The system 310 further provides methods to decorate the various displays of the application with operator provided information. This is analogous to the role of comments in a traditional programming language.

Invocation of the above-listed menu items results in the generation of a dialog box for the operator to supply the system with the required data. Typically, this dialog box is a boilerplate for the fields necessary to complete the particular statement. The system will not insert an incorrectly filled out dialog box, thereby, ensuring a syntactically correct operator inputted programming statement. Where expressions are required in the displayed dialog box, they are parsed for correctness before being inserted. Those of ordinary skill will understand the internal processes invoked by the system when executing the above functions.

The computer program being generated by the system operator (as in FIG. 1) is represented internally as a tree of balanced symbolic expressions. These symbolic expressions (sexps) are quite similar to those found in computer program languages, such as Lisp, and are preferably implemented as a set of utility routines in the underlying BASIC language. All machine code generation and representation display relies on the sexps. The DS 320 stores the representation of the application sequences in this "tree of sexps" form.

The programming panel supports traditional clipboard activities, and allows a great deal of context support. For example, if the operator has a selection in a variables window, that name is available for pasting into the current programming statement boilerplate.

The operator also interacts with the DS 320 by creating objects that represent executable vision tools, while simultaneously manipulating the objects on the VP monitor 322. Representations on the VP and DS monitors 312, 322 are manipulable from a single pointing device, such as pointer 316 or pointer 326.

In a preferred embodiment, the machine vision tools include machine vision analyses, geometric constructions built from them, and/or automation controls. Basic location tools preferably include points located by a correlated search, and points located by one dimensional signal analysis. The operator evoked machine tool is super imposed graphically over an acquired digital image. Measurements performed on the digital image can be performed on selected regions of interest, including light levels, histograms, etc. Acquisition controls preferably include timing, synchronically control, light levels, etc. Operator interface tools can cause particular functions to be executed.

The VP 330 displays via monitor 322 to the system operator one or more graphical icons. These icons preferably embody selected geometric constructions including, points, lines, circles, gauges, and fixtures. Fixtures change the coordinate system by which other machine vision tools are measured. Geometric points are either fixed relative to those fixtures, midpoints, or intersections between other constructions. Lines can also be fixed, as represented by a connection between two points, parallel or perpendicular constructions, angle bisectors, or a result of a "best fit" calculation based on a number of points. Circles can be constructed from other geometric figures, or can be the result of a "best fit" calculation. Gauges can measure differences in distance or angle, within operator designated or closed loop tolerance controls.

The VP 330 preferably contains the implementations of these tools within a unified event driven system that implements a familiar point and click interface to the operator. All tools can be clicked, dragged, double clicked and otherwise manipulated with a pointing device uniformly. The VP 330 system is preferably implemented in the C++ programming language, taking advantage of its inheritance and object-oriented language constructs to provide a clean interface to all of the tools in the system. In a preferred embodiment, the system 310 employs a Motorola 68040 CPU, and an acquisition hardware of conventional construction and design typically available as primitives.

A central event processing loop contained within the VP 330 dispatches events posted by sources in the system. A source is modeled as a pollable device attached to the system. All polling is done synchronously with a polymorphic interface. These dispatches, in ram, control the modal properties of the operator interface and themselves rely on a polymorphic interface to the vision tools to relay the actions of the system operator and the operating environment. Asynchronous events can be handled synchronously by posting them to a waiting queue, and this interface is used to handle discrete input-output transients and serial communication from the DS 320.

The machine vision tools describe the environment they model in terms of geometric constructs. They preferably exist in a selected coordinate system, and their representations are modeled with matrices, vectors, and coordinate transform classes. Several classes support traditional data structures programming: lists, hash tables, reference counted pointers, strings, matrices and vectors, etc.

A further understanding of the illustrated embodiment may be attained by reference to the following sections.

The VP Classes

Array

The purpose of this document is to specify a set of classes that implement data structures that are syntactically and semantically equivalent, to the extent possible and reasonable, to native C++ arrays, but with certain added features. A variable can be declared that acts like a native pointer to a particular type. The following example shows most of the faimilar syntax and semantics of the new array class:

```
// compute a cumulative function
struct e { int x, cum;};
ccArray<e> a(100), p;
(*a).cum = (*a).x;      //a-> is the same as (*a)., as usual
for (p = a + 1; p.indexOK( ); ++p)      // note pointer arithmetic
  p->cum = p->x + p[-1].cum;
```

The new features are:
1) An array pointer can be uninitialized, can point to an element of an array, or can point one beyond the last element of an array.
2) Any pointer arithmetic that results in a value before the beginning or more than one past the end of an array is trapped. Any attempt to reference an element before the beginning or past the end of an array is trapped. Note that negative indicies may be OK, as in the above example. Any attempt to use an uninitialized pointer is trapped.
3) Storage is managed automatically, so that when all pointers to an array have been destroyed, the array is destroyed.
4) Elements can be inserted and deleted. When an element is inserted, the index of elements after the insertion point increases by 1; when an element is deleted, the index of elements after the deletion point decreases by 1. Existing array pointers to elements in an array, by contrast, are unaffected by insertion and deletion (except see #5) they still point to the same element.

5) When an element is deleted, any existing pointers to that element are considered stale, and any attempt to use them is trapped. A stale pointer can be reassigned to a fresh value.

6) Arrays are polymorphic any of a variety of storage management styles can be chosen when the array is constructed to satisfy requirements such as zero storage overhead, insert/delete speed, random access speed, heap usage, and assembly language compatibility. These styles are totally interchangable and invisible to the non-assembly language array user.

7) Common array operations are very efficient. The operations *p, p→, and checking to see if a pointer has reached the end of an array are nearly as fast as for native arrays, for all array storage management styles.

2. Design Overview

Arrays are based on the handle/rep class style, but differ sufficiently from the standard handle classes That they are not derived from ccHandle<T> and ccHandleBase. The handle class ccArray and the rep classes derived from the abstract base cc__Array are template classes of one class parameter, the data type that the array will hold. The rep class is a friend of the handle class, but not the other way around, so that implementation details are confined to the rep class and not spread to the handle.

The handle class and the rep base class implement basic functionality that is common to all array types (storage management styles), and define a small number of pure virtual functions for derived classes to override to plug in a specific storage management style.

An array pointer (i.e. handle) can be in four states: uninitialized, pointing to valid element, pointing 1 beyond end, and stale. It is a central property of the design that handles are compact and can be used efficiently but safely, without unnecessary storage overhead for representing the states and without excessive time spent testing the state. Careful consideration was given to the act of iterating over an array, where for each iteration one must: check for the end, reference the current element one or more times, and advance to the next element. It is important that each of these three operations is safe in isolation, yet when used together there is minimal redundent testing of state. In the specified design, all of the real work is done when advancing to the next element referencing and checking are simple inline functions, yet still safe. Finally, note that these properties must hold in spite of insertion and deletion operations, and for almost any conceivable storage management style.

The handle class is derived from ccUnwind and contains a pointer to the rep class, a pointer to an element of the array, and a link pointer so that handles can be put on lists—handle is 20 bytes and the constructors are terse. The rep class pointer is always valid and is never tested—for uninitialized handles, the pointer is not null but points to a static instance of a rep class where all of the virtual functions are overridden to throw an error. The element pointer either points to a valid element of the array or is null—this makes the referencing operations *p and p→, and checking for valid pointer, fast. A null element pointer could mean either pointing 1 beyond the end or stale—the state is implied by which list the handle is on, as described below.

All existing handles for a given rep class are chained together on one of two lists maintained by the rep class, one for fresh handles and one for stale. The lists serve several purposes:

1) To distinguish stale handles from end-pointing ones, with zero space and testing time overhead.

2) To determine when the rep class can be destroyed (both lists are empty).

3) To find handles that must be made stale as the result of a delete operation.

4) To allow certain storage management schemes to find and update handles if insertion or deletion operations cause element addresses to change.

Note that clients of ccArray can obtain the actual address of array elements using either &*p or &p[i]. This is dangerous, because none of the bounds checking, stale checking, relocation adjustment, and storage management operations apply to native pointers. We could prevent clients from obtaining raw addresses by specifying a different syntax and semantics, but the cost, complexity, and inconvenience seem excessive. Furthermore, it is clear that real-world engineering considerations will occasionally require us to use the raw addresses, presumably under carefully constrained circumstances that include knowledge of the storage management scheme in use. Thus we do not forbid clients to obtain a raw address, but we do discourage it.

3. Detailed Design ccArray ccArray<T> is a custom handle class. No derivation from ccHandle is needed since it's functionality is embedded in ccArray. ccArray contains a pointer to the rep class to use. This pointer is always valid. An uninitialized pointer is one that points to a class called cc_UninitArray. All member functions throw an uninitialized error. In contrast, ccHandle performs a check everytime an access to the handle is made.

ccArray has the element of a starting element which does NOT have to be the first element in the buffer. Negative indices are used to access elements which are before the starting element.

If an element is removed from the list that another handle is pointing to, that class is removed from the handleList and placed on the staleList. The rep class keeps track of which handle classes are accessing data for a couple of reasons. The first is to check that valid accesses are being made. A null pointer indicates a problem with the handle. If the handle is on the stale list, the error occurred because the class pointed to an item that is no longer on the list. The second reason is that some implementations of the rep class may have to dynamically relocate data. For example, the gap array may move elements around to optimize the process of inserting new elements. When blocks are moved, the handleList is examined to see if any handles are pointing to an affected element. These pointers are corrected to point to their new location.

The primary member functions are:

ccArray (type, size)

Constructs an array of the specified type and size. Current choices are:

ccArray (ccArrayType::fixedArray, size)
Creates a fixed array of indicated size. Array elements are not initialized.

ccArray (ccArrayType::byteGapArray, size)
Creates a gap array of the indicated size. Byte copying is used to move elements in the buffer.

ccArray (ccArrayType::ctorGapArray, size)
Creates a gap array of the indicated size. A constructor (using placement syntax) is used to move elements in the buffer.

int index ()
Returns the index of the current element relative to the starting element in the buffer. The starting element is mearly a pointer to any element. Negative indices can result if the starting element is not the first element.

int indexOK ()

Returns true if the current element is valid.

int indexOK (int index)

Returns true if the indicated index is valid. The index is relative to the starting element.

void indexCheck ()

Checks the current element for validity and throws an error if it isn't. The error can either be stale or bounds error.

void indexCheck (int index)

Checks the specified index for validity. A bounds error is thrown if the index is not valid.

ccArray<T> first ()

Returns a new handle whose current element is the first one on the list.

ccArray<T> end ()

Returns a new handle whose current element is one past the last one on the list. This is used primarily to insert new items at the end of the list (insertions always are made in front of the current element).

T& operator [] (int index)

Returns a reference to indicated element. A bounds error is thrown if the index is invalid.

T& operator * ()

Returns a reference to the current element and throws either a bounds or stale error if the current element is invalid.

ccArray operator+(int index)
ccArray operator−(int index)

Returns a new handle whose current element is relative to the original one by the specified amount. A bounds error is thown if the new element is invalid.

ccArray& operator+=(int index)
ccArray& operator−=(int index)

Moves the location of the current element by the relative index, bounds error is thown if the new element is invalid.

ccArray& operator++()
ccArray& operator−−()
ccArray operator++(int)
ccArray operator−−(int)

Pre and Post increment/decrement the current element. Pre decrement/increment returns a new handle. A bounds error is thown if the new element is invalid;

ccArray insert ()

Insert a new element in front of the current element. The new element remains uninitialized, An unimplemented error is thown if the array type does not allow insertions.

ccArray insert (const T&)

Insert the specified element in front of the current element. The new element remains uninitialized, An unimplemented error is thown if the array type does not allow insertions.

ccArray& remove ()

Remove the current element from the array. A bounds or stale error is thown if the element is invalid. Otherwise it is removed from the list and all other handles that currently point the element are moved to the staleList.

ccObjArray ccObjArray<T> is identical to ccArray (it's derived from it) except the addition of a single member function. The "−>" operator is defined to allow direct access to elements of the objects in the array. It's pretty easy to decide when ccArray or ccObjArray should be used. Basic types such as int's and float's must use ccArray since the → syntax has no meaning (besides, the compiler will generate an error during the instantiation). Arrays of objects or structs can use either one but it's better if they use ccObjArray to avoid the need to someday change it.

T* operator → ()

Returns a pointer to the current element so that access to one of its elements can be made.

cc__Array cc__Array<T> is the rep base class. Only the handle class can access its member functions. cc__Array is virtual and requires a derived class to define at least five functions. Four other functions are optional and are defined either to get functionality or efficiency.

cc__Array owns the linked lists for handleList and staleList (The linked lists are used because they're simple and efficient). Any handle class that references the array has an entry on one of these lists. An entry can only get on the staleList if the current element that it points to is no longer on the list.

The virtual functions that must be defined by all derived classes are:

T* lookup (T* base, int index)

Returns a pointer to the element at the specified index relative to the specified base. A bounds error should be thrown if the requested element is not in the array. 0 is returned if the element points to one past the end of the list. This state is not an error condition.

int index (T* base, T* rel)

Computes the index of the item relative to the specified base element.

T* insert (T* beforeHere)

Inserts a new element before the specified one. A bounds error is thown if the specified element is invalid. The behavior when the list is full or no insertions are allowed is application specific. See the derived classes for specifics.

T* insert (T* beforeHere, const T& value)

Inserts the specified element before the specified one. The same requirements lists above still apply.

T* remove (T* thisOne)

Remove the specified element from the array. The handle cl ass insures that the element is on the list.

Other virtual functions that can be overridden:

T* access (T* base, int index)

Exactly like lookup except that a bounds error is thrown if the element is one past the end of the array. access() is used instead of lookup() when data must be retrieved.

int indexOK (T* base, int index)

Returns 1 if the current index relative to the specified base is valid, otherwise a 0 is returned. It's implemented by setting up a catch handler and executing the lookup function. It's best to override this if possible.

ccArray compress ()

Compress the current array. The default behavior is to return a new handle to the current array. Some derived classes like the gap array override this to return a new array with all the unused space removed.

cc__UninitArray

Derived from cc__Array. All the virtual functions in cc__Array are defined to throw an uninitialized error. Creating a ccArray of no specific type creates a handle which points to a static instance of cc__UninitArray.

cc__FixedArray cc__FixedArray<T> implements a fixed array. Once constructed, elements cannot be inserted or removed or else an unimplemented error is thrown. Construction is of the form:

ccArray (ccArrayType::fixedArray, size)

where size if the size of the array.

cc__GapArray cc_GapArray<T> implements a gap array. Elements can be inserted and removed but the emphasis is placed on insertion. The buffer space allocated to the array looks like:

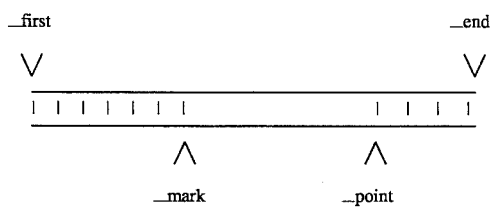

_first  The beginning of the array buffer
_end    The address just past the end of the array buffer
_mark   The first address of the gap
_point  The address of the first element after the gap. All insertions are made in front of the _point (ie: at the _mark).

Construction is of the form:

ccArray (ccArrayType::byteGapArray, size) Elements of a byteGapArray are copied internally using cu_copy. A range of elements can be moved using a single call.

ccArray (ccArrayType::ctorGapArray, size)

Elements of a ctorGapArray are moved using a copy constructor with placement syntax. Movement is much slower because elements must be moved one at a time. The destructor is explicity called after the element has been moved. If you see this part of the code commented out it's because of a Cfront bug because the dtor call is inside a template.

The byte and ctor variations are implemented as a single class because most operations are identical. I didn't see the benefit of implementing them as separate classes that derive from a common base class.

Insertion:

Insertions can be done at very high speed. The basic steps are:

If the insertion point is not the _point, move the records so that it is. The handles in the handleList are scanned to see if any of them point to an element that was relocated and corrects for it if it is. For multiple insertions at the same point, this overhead occurs only for the first insertion.

The new element is copied into the buffer at _mark.

_mark is incremented to point to the next available location.

Remove:

Removals of neighbors lower in the list can be done at high speed.

The basic steps are:

If the item to be removed is not at _point, move elements in the buffer until it is. This step is identical to the first step of insert.

Remove the element at _point by incrementing _point. A ctorcopy array will call the destructor first (assuming the Cfront 3.0 bug gets fixed).

A list that is full is indicated by the _mark and _point being equal.

The compress() function removes any unused space by creating a new ccArray of a size that will just hold the elements and then copies them from the old array to the new one.

Exceptions
Exception Handling in the Cognex Vision Class Library (VCL)

1. Client Usage

The exception handling system in the VCL is the key to what we can consider to be "safe" programming. The VCL uses this library based scheme, at least until implementations of the ANSI proposed mechanism are available. This implementation uses a minimum of intrusion on the developer of VCL classes and provides stack unwinding, including frames from inside partially constructed objects.

Stack unwinding is the correct destruction of automatic and temporary (on the stack) objects in reverse order of the scopes they have been destroyed in. For built in types (double, int, et. al.) and objects without a destructor, this is a null operation. For objects with a destructor, this means invoking it, just as if control flow had left its enclosing block.

EXAMPLE

```
class x {
public:
        X( );
        ~X( );
};
ccSignal   Xalloc = "Exception Signal to be handled";
int bar ( ) { Xalloc.Throw ( ); }
int foo ( )
{
        X         blue;
        bar ( );
        X         red;
}
int main ( )
{
    cmCatch (Xalloc, xsignal);
    if (xsignal)
            cout << "Xalloc signal caught" << endl;
    else
    {
            foo ( );
            cout << "No signal caught" << endl;
    }
    cout << "Exit program" << end
}
```

In the example, the class X has a destructor. Automatic objects of type X will need to be destroyed correctly when the stack is "unwound" past them. An exception to be caught is declared. The type of an exception in the VCL is ccSignal. Exceptions are also called signals, but should not be confused with asynchronous signals (interrupts) from the ANSI C library. Only static objects of class ccSignal may be declared and the constructor takes a char* argument which represents a string to print in error conditions.

A function that throws this signal, int bar (), is defined. The syntax of the throw in the VCL system is used. This is slightly different than the ANSI syntax. Note that "throw" is a C++ keyword even now, so we use a member function of ccSignal named "Throw".

"int foo ()" is a function that creates some automatics and calls a function. Function foo has no idea that an exception may be thrown and doesn't know what to do with any signal thrown (it has no catch handlers).

The main function declares a catch handler. This is a declaration of intent to stop the stack unwinding and deal with the error in some way. The first argument is the signal to catch, the second behaves like a declared pointer to ccSignal. If it is null, no exception has been caught. Otherwise, it points to the exception caught. The _if_ statement represents the "try block" and the "catch clause". The syntax of catch clauses and try blocks in our system is different from the ANSI syntax, but the functionality is similar.

A try block is a group of statements that might throw an exception that you would like to handle. A catch clause is what you will do once you catch such an expression.

The example starts the program in main and sets up a catch handler. The catch handler implicitly declares a pointer to ccSignal named xsignal. The catch clause is the true branch of the if statement and the try block is the false branch. The try block calls foo (). If foo returns, it will print "No signal caught". The function foo creates an X named blue and calls bar. Bar throws Xalloc. At the point of the throw the stack looks like this:

```
-int main ( )-
    local: xsignal
    Catch handler for Xalloc
    -int foo ( )-
        local: blue
        -int bar ( )-
            throw point of Xalloc
```

The X named red has not been constructed. Stack unwinding begins, and we go up out of bar into the frame of foo. The X named blue is destructed, but the X name red is not (correctly so). We pass up out of foo and encounter the catch handler for Xalloc. Stack unwinding is over and control passes to the beginning of the catch clause. The catch clause prints "Xalloc signal caught" and main continues. The message "Exit program" is printed and with the exit from main, the program halts.

One important distinction between this implementation and the ANSI specification is that the scope and lifetime of catch handlers are not limited to the try block itself. The catch handler is still active after the try block and in fact has the same lifetime as a local variable declared in the scope in which the cmCatch appears.

```
int main ( )
{
    cmCatch (Xalloc, xsignal);
    if (xsignal)
        cout << "Xalloc signal caught" << endl;
    else
    {
        foo ( );
        cout << "No signal caught" << endl;
    }
    cout << "Exit program" << endl;
    foo ( );            // Call foo here also
}
```

Let us change the given example slightly. If we add a call the function foo after the print of "Exit program", we get a different behaviour. The program will execute as before until we call foo for the second time. This will eventually throw Xalloc. The catch handler for Xalloc is still active (until the right brace that closes int main ()) and so the exception is caught. The catch clause is executed and execution continues exactly as before after the end of the if-else blocks. "Exit program" is printed again, foo is called again, and the program loops infinitely.

Signals may be grouped in a runtime structure to indicate families of exceptions to be caught. By convention, all signals are defined to be descendants of ccSignal::all. New types of signals can be derived from ccSignal. Commonly, new signal types will carry specific information about the event that caused the throw to occur. Examples of both of these in the VCL can be found in cc2Vector.

ccSignal contains two member functions to throw an exception: void Throw () and void error (). Both will print diagnostic information if there is no active catch handler for the signal thrown. If the catch for the signal is a "catch all" or "cmCatch (ccSignal::all, x)" and the exception is thrown with the error method, diagnostics will also be printed. The member function const char* name () retrieves the string used in construction, the function message will print this name on the ostream. Signals derived from ccSignal often redefine message to print other event specific information.

The C++ automatic storage class for objects is the language mechanism that is used for implementing the catch handlers. Catch handlers "behind the scenes" create an object on the stack that registers the type of exceptions that will be caught at that point. For simple use, and those usages that similarly conform to the examples given here, the mechanism provides an easy way to specify handlers. Be aware, however, that much mischief is possible. Catch handlers are legal anywhere that multiple declarations are, and have lifetimes and scopes corresponding to objects declared at_ that point. Pathological examples abound.

Example 1

```
ccSignal Xalloc_in_strings ("No storage for strings", Xalloc);
int foo (void)
{
    cmCatch (Xalloc_in_strings, sxsignal);
    cmCatch (Xalloc, xsignal);
    if (sxsignal)
        // Never reached, Xalloc catch supersedes this catch.
}
```

Example 2

```
int foo (void)
{
    for (cmCatch (Xalloc, xsignal); ; x = x->next( ))
    // cmCatch is a declaration, so should be legal, right?
    // It's actually implemented with two declarations, so this is
    // illegal.
}
```

Example 3

```
int foo (void)
{
    cmCatch (Xalloc, x1signal);
A:  if (x1signal)
```

```
            // handle it
        else
        // try code
    {
            cmCatch (Xalloc, x2signal);
B:      if (x2signal)
            // handle it
        else
            // try code
C:      } // This block ends the lifetime of the x2signal cmCatch above.
        // etc.
D:  cmCatch (Xalloc, x3signal);
        // This catch overshadows the x1signal declaration above.
}
```

| Throw origination | Handled by |
|---|---|
| Start of foo to A: | function chain calling foo( ) |
| A: to B: | x1signal handler |
| B: to C: | x2signal handler |
| C: to D: | x1signal handler |
| D: to end of foo | x3signal handler |

2. Developer Usage

The design of classes that are built to use an exception mechanism have a tremendous dependence on the philosophy and goals used to design the exception system. Section 3–5 discuss these goals and the evolution of the system. This section will concentrate on summarizing the principles that a designer of a class that participates in this mechanism must know. In particular, our mechanism is intrusive on the design of a class. The full requirements and details of class usage is given in section 7.

The first decision that a designer must make when looking at a particular class, is what needs to be done in the destructor. What will happen if the destructor is not called? For some, it may simply "leak" memory. For other classes, it may push global collections and references to the class out of sync or not release global hardware resources.

In the simplest case, one does nothing. If the class has no destructor, i.e. it does no cleanup, nothing is necessary. An example follows.

```
class real
{
public:
        Real (double);
        operator double ( );
        friend ostream operator << (ostream&, const Real&);
        // etc.
private:
        double value;
};
```

Note that all storage for the class is on the stack and there are no intrinsic global references, i.e. the class is not placed a global list anywhere (visa vis VCL screenObjects). If the stack is unwound past a Real object, there is no destructor to call. This category of classes is called "simply constructed".

For a class that has a destructor that does something (is non empty) the "intrusion" on the source text begins to appear. Consider this case . . .

```
class String
{
```

```
public:
        String (const char*);
        ~String ( );
        String& operator = (const String&);
        String (const String&);
        // etc.
private:
        char* storage;
        unsigned len;
};
```

This class needs to be annotated with the information necessary for the exception mechanism to find it when unwinding the stack. The correct definition would look like this:

```
class String: public ccUnwind
{
public:
        cmObjectInfoDcl;
        String (const char*);
        ~String ( );
        String& operator = (const String&);
        String (const String&);
        // etc.
private:
        char* storage;
        unsigned len;
};
// string.c
cmObjectInfoDef (String);
const ccObjectInfo& String::repInvariant (int) const
{
        // Do repInvariant stuff
        // See $localDOC/test.frame.txt for description
        ccUnwind::repInvariant ( );
        return *this;
}
```

Such a class is called unwind constructed.

One further category of class is called "complex" constructed. It fulfills the requirements of unwind constructed classes, but makes necessary special provisions for throws occurring during the construction process, leaving the object partially constructed. For completeness, an example looks like this:

```
class ScreenShape : public ccUnwind
{
public:
        cmObjectInfoDcl;
        ScreenShape     (Screen&, double, double);
        ~ScreenShape ( );
        ScreenShape     (const ScreenShape&);
        // etc.
private:
        Matrix coordinates;
        Xfrom transform;
        // etc.
};
// screenshape.c
cmObjectInfoDef (ScreenShape);
ScreenShape::ScreenShape (Screen&, double d1, double d2) :
        coordinates (d1), Xform (d2)
//      these constructors might fail
{
        cmCStart;
        // etc.
}
ScreenShape::~ScreenShape ( )
{
        cmDStart;
        // etc.
}
ScreenShape::ScreenShape (const ScreenShape&)
{
        cmCCantFail;
}
```

At this point in designing a class, you should make sure to know the rules in Section 7 thoroughly. Two major limitations must be kept in mind: no destructor may throw an exception, and no "ctor-initializer" may throw an exception. A ctor-initializer is the expression used to initialize a member of a class using the colon, member initializer list syntax. As above:

```
ScreenShape::ScreenShape (Screen&, double d1, double d2) :
        coordinates (foo(d1)), Xform (foo(d2))
//      foo(d1) and foo (d2) may not fail.
```

3. Background

Exception handling is a necessary component of Cognex vision processors, which are expected to operate indefinitely without rebooting. The mechanism specified in the C++ reference manual and accepted by the ANSI committee would be ideal, but is not available and is not expected to be so anytime soon. The catch/throw mechanism that we use in our C library is not sufficient for C++ programs, because automatic variables are not destroyed on throws, and suffers from other problems that have resulted in numerous bugs over the years. This new system is intended to address these problems.

In the following discussion, I assume that the reader is familiar with either the ANSI standard or our C library mechanism, so that I don't have to define a bunch of basic terminology.

The proposed ANSI standard, our C library catch/throw mechanism, and this new system are semantically very similar, although the syntax and some operational details are very different. Each version implements the termination model of exception handling: On detecting a condition that prevents a code fragment from achieving its intended result, control and some information may be passed back to some dynamically determined point, in a currently active block that directly or indirectly invoked said fragment, that has indicated its ability to handle the error. Control cannot subsequently resume at the point of the error.

4. Functional Requirements

The following functional characteristics are mandatory:

1) A set of signals can be defined that correspond to the set of errors that can be detected. A throw specifies a specific signal, and a catch specifies either a specific signal or all signals. A catch can determine which signal was thrown.

2) A throw transfers control to the most recently activated catch that is still active and that specifies either all signals or the signal thrown.

3) All automatic variables that were constructed after said catch are destroyed in reverse order of construction, exactly as specified by the language rules.

4) A catch is deactivated whenever the block that contains it is exited.

5) Throws must be permitted in constructors. Quoting from Ellis & Stroustrup, "An object that is partially constructed will have destructors executed only for its fully constructed sub-objects. Also, should a constructor for an element of an automatic array throw an exception, only) the constructed elements of that array will be destroyed."

The following functional characteristics are desirable:

6) In addition to a specific signal or all signals, a catch can specify a group of signals.

7) Information can be passed back to the catch in addition to the identity of the signal thrown.

8) A function can be called to determine if there are any active catches, not counting those specifying all signals, that can handle a given signal.

9) An individual compilation unit can define a unique signal without knowing about signals defined by other compilation units (i.e., signals are not defined by integer constants).

10) Very little run-time overhead, in space or time, is required for code that does not do a throw.

11) The mechanism does not depend on language behavior that is implementation dependent, and does not require any modifications to the compiler or its C output if any.

12) The mechanism requires a minimum of explicit action on the part of the programmer (changing "a minimum of" to "no" is a lost cause given #11), and any misuse of such explicit actions will result in compile or run-time error messages.

13) Classes provided by 3rd parties, such as AT&T's Standard Components, that do not follow the conventions required in #12 and for which we do not have the source, can nevertheless be used (presumably by deriving a class that does follow said conventions).

5. Signals

A signal is an instance of the class ccSignal or a class derived from it. All instances of ccSignal are static, so that #9 is assured by the uniqueness of static object addresses. All signals in the system are organized into a tree with a single root, where the terminal nodes are specific signals, the non-terminal nodes are groups, and the root is the special group consisting of all signals. The signal tree is a run-time structure that is independent of any class hierarchy of signals derived from ccSignal.

By convention, a signal is not a global identifier but rather is a public static member of the appropriate class. For example, the signal that specifies the special group of all signals is ccSignal::all.

Throw and other related functions (but not catch) are virtual member functions of ccSignal.

An instance of ccSignal contains a printable signal name (i.e. a string) that is generally more descriptive than the identifier used in programs. To pass additional information from a throw to a catch, one derives a class from ccSignal that includes the additional information. ccSignal has a virtual member function that uses any such additional information to print a long message describing the error. This function would be overridden in any derived class.

6. Coding Conventions for Catch and Throw

The member functions Throw, error, and willCatch of the class ccSignal correspond to our C library functions cct_throw, cct_error, and cct_willcatch. Use, therefore, is something like this:

ccSomeClass::signalName.Throw ()

ccSomeClass::signalName.error ()

ccSomeClass::signalName.willCatch ()

Note that "throw" is a reserved word, so I use "Throw". These can be used anywhere an expression is legal.

A catch looks something like this:

```
{ someType a, b, c;
  cmCatch (ccSignal::all, signal);
  if (signal)                    // signal caught?
  { // catch handler
    signal->Throw ( ); // re-throw signal caught
  }
  else                           // not needed if handler can't fall through
  { // equivalent to ANSI standard "try" block
    someType x, y, z;
  }
  // catch still active here unless signal already caught
} // catch deactivated
```

"cmCatch" is a macro that declares its second argument to be of some special type that behaves like a ccSignal*, and installs a catch on the signal or group specified by its first argument. The cmCatch macro is used like a declaration and not like an expression. In the above example, the cmCatch can be thought of as declaring "ccSignal* signal=0"; if a signal is caught, "signal" will point to it. Note that "signal" is not actually a ccSignal*, but is made to behave like one by operator overloading.

In the above example, when the catch handler is entered the automatic variables a, b, and c will exist but x, y, and z will have been destroyed.

7. Coding Conventions for Classes

In the following, a section of code is said to "fail" if the code terminates with a throw. A throw that is caught within the section of code and does not propagate outside (for example, by being re-thrown) is not a failure.

All classes must be simply-, unwind-, or complex-constructed. For a class provided by a 3rd party for which we do not have source and that does not satisfy these rules, one must derive a new class that does.

Informally, if you are writing a class with no destructor, and construction can't fail, do nothing special (it doesn't matter if your class has bases or members with destructors, or bases that can fail to construct). If your class has a destructor, but the constructors and members can't fail, then build it according to the rules of unwind-constructed classes. If it has one or more constructors or members that can fail, build it according to the rules of complex-constructed classes.

Strictly speaking:

A class is called "simply-constructed" if and only if:

1) It has no destructor body (it can have a default destructor).

2) No constructor body or ctor-initializer expression can fail.

3) No constructor body contains the macro cmCStart or cmCCantFail.

4) No member object can fail to be constructed (base classes don't matter).

A class is called "unwind-constructed" if and only if:

1) The class ccUnwind is a non-virtual base class.

2) No constructor body or ctor-initializer expression can fail.

3) No constructor body contains the macro cmCStart or cmCCantFail, and the destructor body, if any, does not contain the macro cmDStart.

4) No member object can fail to be constructed (base classes don't matter).

5) It includes the cmObjectInfo macros in the class definition.

A class is called "complex-constructed" if and only if:

1) The class ccUnwind is a non-virtual base class.

2) It has a destructor body that starts with the macro cmDStart.

3) All constructor bodies that can fail start with the macro cmCStart; all others start with either cmCCantFail or cmCStart.

4) No ctor-initializer expression can fail (the constructor for objects initialized with ctor-initializers can fail).

5) It includes the cmObjectInfo macros in the class definition.

Note that the base class ccUnwind can be declared in any order.

These rules are designed to allow the programmer to make tradeoffs between efficiency and safety as appropriate in practical situations. The programmer can, for example, make every class complex-constructed so that there is no possibility of misinterpreting the rules or being subject to changing implementation of member objects, but doing so is probably unnecessarily inefficient. The rules for simple- and unwind-construction are provided to allow more efficient classes when possible, although the rules never require that they be used. If is important to note that, with some exceptions discussed below, one can determine that a class is constructed according to the rules using only information contained in that cl ass, without reference to its bases or members. Thus if information about bases or members is not available or is subject to change, the class is still safe. I will call this the "local unwind construction rule". There are three exceptions to the local unwind construction rule, two minor and one major. The major exception is the need To know if a member object can fail to be constructed. In most cases the programmer should assume that all member objects can fail, and build a class complex-constructed if it has any member objects. This means that a class can be made simple- or unwind-constructed only if its data members are exclusively built-in types (this is common with simple classes).

The first minor exception is the need to know if a constructor body can fail. The only reason that this information is not local to the class is that the constructor might call some function, or declare some object, without knowing whether such a call or declaration can fail. There are many cases, however, where it is clear that a constructor body can't fail, for example bodies that are empty except for the macro cmCCantFail. Note that if a constructor has a ctor-initializer, failure of one of those initializations is member object failure, covered in the previous paragraph, not constructor body failure.

The second minor exception is that ccUnwind need not be a direct base. There is a danger, however, in relying on another unwind-constructed base class to provide ccUnwind for you, If the implementation of that base later changes to make it simply-constructed, the derived class might break. It would be permissible, even recommended, that a class derived from unwind-constructed bases redundantly include ccUnwind as a direct base, to avoid this danger. Note, however, that the compiler (Cfront 3.0) will not accept ccUnwind as a direct base class if it is also an indirect base class, because any reference to its members would be ambiguous. The compiler issues a warning (not an error) and simply omits ccUnwind from the class. Unfortunately, this is a case where the compiler is wrong—we never refer to any of ccUnwind's members, we simply want it constructed and destroyed appropriately. One has 3 choices: omit ccUnwind, ignore the warning, or make an empty class with ccUnwind as a direct base to avoid the ambiguity:

class fooUnwind: public ccUnwind {};

class foo: public fooUnwind, public someClass { ... };

There is one significant limitation of the above rules that must be understood—there is no way to build a class where a ctor-initializer expression can fail. Again, the member object being constructed by such an initializer can fail, but the expressions used as arguments to the object's constructor cannot. If a member object needs to be initialized based on the result of an expression that can fail, there are two choices: either put the initialization in the constructor body, or, when that is not possible, wrap the expression in a function that catches all signals and takes appropriate action if a signal is caught. Appropriate action might be to initialize the object to some error state, test for that state in the constructor body, and if detected do the throw in the body. If experience shows that this is a common problem, it should be possible to provide a more general solution, similar to the use of cmCStart in constructors.

8. Implementation Overview

The actual transfer of control from a throw to a catch, and restoration of the machine environment, is handled by the ANSI standard functions setjmp and longjmp. Thus all implementation-dependent details are handled by standard functions, satisfying #11 and resulting in a portable implementation.

The cmCatch macro declares an automatic "catch frame" object, and then does a setjmp. cmCatch must be a macro, because the setjmp must be executed in the block where the catch is established. cmCatch could in principle be an inlined member function if we could guarantee that the function would always be inlined, but the language rules do not require the compiler to do so.

The constructor for the catch frame object links the catch frame at the head of a list, called the catch list, and remembers the signal or group to be caught and which unwind-constructed automatic objects currently exist. The destructor removes the catch frame from the list, which must be at the head or a fatal error results.

In our C library mechanism, considerable implementation-dependent hacking was used to get catches to be deactivated when functions containing them returned. Use of automatic objects and destructors in C++ neatly solves this problem. One consequence, however, is that catches are deactivated when the block, rather than the function, containing them exits. Although there are cases where some may consider the new behavior to be overly restrictive, I consider it in general to be mandatory—once a block exits its environment (automatic variables) is destroyed and one cannot simply transfer control back into the middle of it.

Since the catch frame object must be automatic, steps are taken to prevent unintended use. First, the class name is cc_CatchFrame. If ever you see this name in a program, it is an error. Second, operator new and delete are overloaded and made private member functions of cc_CatchFrame. These steps should prevent accidental misuse; intentional misuse cannot, as far as I can tell, be prevented. Note that we could have the constructor for cc_CatchFrame check to make sure that the object is on the stack, but I consider that unnecessary run-time overhead given the other precautions. Even that step doesn't prevent all illegal uses, such as using cc_CatchFrame as a base or member of another object.

Now for the tricky part—the construction and destruction of automatic unwind-constructed objects.

First, we must have some means for determining if an object is automatic. The means we use is technically implementation-dependent, but should cover any reasonable single-threaded implementation.

An object is automatic if and only if it is on the stack. We determine if an object is on the stack by looking at its address. We assume that there is one stack and that it occupies contiguous memory locations. We assume that if function A invokes function B, then all automatic variables in B are closer to the top of the stack than all automatic variables in A, which can mean either higher or lower memory addresses (stack growth direction is unimportant). We make no assumptions about the order of allocation of automatics in a function; in particular, automatics in nested blocks are not necessarily closer to the top of the stack than those in containing blocks.

These assumptions allow us to determine an address near the bottom and top of the stack so we can determine if some address is between them. The function "main" declares an automatic, remembers its address, and calls the function userMain, which replaces the functionality of main. This address is considered the stack bottom. A function is defined to determine if an address is on the stack. That function also declares an automatic, and considers its address to be the top of the stack. The rest is simple arithmetic.

We considered using a constructor for a static object to determine stack bottom, but rejected it as not guaranteed to work. We also considered using the address of the catch frame at the top of the catch list as an effective stack bottom, but this would require that automatics in a function are allocated in construction order, which is not guaranteed.

Next, one must understand exactly how objects are constructed and destroyed. The order of construction is not implementation-dependent but rigidly specified by the language: first virtual base classes in a particular order (details unimportant here), then non-virtual base classes in declaration order, then member objects in declaration order, then the object's constructor body. The order of destruction is similarly constrained, and is the exact reverse of construction.

The other important part of the construction/destruction story is access to virtual functions defined in base classes and overridden in the derived class that we are constructing. While the base classes are being constructed, calls to such virtual functions refer to the base class functions, not the overriding derived class functions because the derived class isn't yet fully constructed. At some point after all bases are constructed but before the derived lass's constructor body is entered, the object is switched over to use the overriding virtual functions. This switch point can be before, after, or, I suppose, during the construction of member objects. Although the reference manual does not discuss this, according to Sam the ANSI committee considers the switch point to be implementation-dependent. Normally class behavior is unaffected by the choice of switch point, but here the choice is crucial. In the following discussion I will assume the most general case, that zero or more member objects are constructed before the switch point and zero or more after.

In order to understand why key implementation decisions were made, I will describe the operation of unwind-constructed objects in historical sequence: A simple mechanism that did not work, a slightly more complex mechanism built upon the first that also did not work, and finally the current version, somewhat more complex and built upon the second, that does work. The goal is to justify the current design as minimal given #12 above. Furthermore, I believe that the most important purpose of comments in source code is to explain why design decisions were made, so that modifications won't break the code.

The active ingredients in ccUnwind are a constructor, a virtual destructor, and a link pointer for making a list. The constructor checks to see if the object is automatic, and if so puts it at the head of the unwind list. If not, the object is marked by making its link point to itself (null is of course used by the ccUnwind at the tail of the list). The destructor first checks to see if the object is marked as not automatic, and if so does nothing. Otherwise, we search the unwind list for the object and remove it.

Note that the object is almost always at the head of the list, due to the language rules requiring destruction in reverse order of construction. One case where this strict ordering can be violated is when temporary objects must be constructed during the initialization of automatic objects.

As unwind- and complex-constructed automatics are constructed and destroyed during the normal course of program execution (i.e., no throws), the ccUnwind objects that they contain will be linked and unlinked in proper sequence. No subtle or interesting behavior occurs so far.

When a throw is done, we scan the catch list to find the first catch frame that matches the signal being thrown. We then repeatedly destroy the ccUnwind at the head of the unwind list, by explicitly calling its destructor, until the ccUnwind at the head of the list is the one remembered in the catch frame as existing before the catch was installed. (If no catch frame matched the signal, we destroy them all and exit). Since the ccUnwind destructor is virtual, calling it will destroy the complete object that contains it.

This simple mechanism works, in most cases, regardless of the position of the ccUnwind in the base class list; regardless of whether the ccUnwind is a virtual base class or not or even if some classes declare it virtual and others do not; regardless of whether other base classes are simply- or unwind-constructed; and regardless of switch point. If we require ccUnwind to be non-virtual, it also correctly handles destroying partially constructed objects in case a constructor does a throw. It does not, however, work if the class contains unwind-constructed members.

Consider a class with a bunch of unwind-constructed bases and the direct base ccUnwind, but no unwind constructed-members. The bases will be linked on the unwind list in declaration order. While the bases are being constructed, and therefore before the switch point, the ccUnwind virtual destructors access the destructors for the base sub-objects, so if a throw is done while constructing a base only the constructed sub-objects will be destroyed. After all bases are constructed, and after the switch point, all of the ccUnwind virtual functions access the destructor for the derived, complete object, so calling any one of them (i.e., the one at the head of the unwind list) will destroy the entire object and unlink all of them in the process in the right order.

Now add unwind-constructed members. These will be linked on the unwind list after the base classes due to the required order of construction. Since they are not base objects, however, their virtual destructors cannot access the destructor for the complete object. If we follow the current algorithm and destroy the object at the head of the unwind list, we will make 2 fatal errors: first, the order of destruction is wrong, because the member object is destroyed before calling the destructor body of the complete object; and second, the members are destroyed twice.

Clearly, we must determine if an object is a member of a previously constructed object. This information could be used either at construction time, to prevent linking the member on the unwind list, or at throw time, to skip over member objects.

I considered two ways to determine object membership: maintain an object construction level count that is incremented when constructing ccUnwind and decremented in constructor bodies; or check if an object's address falls between addresses determined by a previously constructed object's base address and size. The latter method is somewhat implementation-dependent, but not really more so than the method used to determine whether an object is automatic. The former method has a more serious disadvantage—it requires that a class with one or more unwind-constructed bases, and one or more unwind-constructed members, be unwind-constructed even if it has no constructors and destructor itself. When one is writing a class, one does not know in general whether bases and members are unwind-constructed, and such details may change over time. I consider it highly desirable that the decision to build a class as simply- or unwind-constructed be made independent of the status of bases and members.

To implement membership checking by address, I defined an abstract base class ccObjectInfo, containing public virtual member functions that provide information about an object derived from it, such as base address, size, and a printable name. ccUnwind is then derived from ccObjectInfo, which adds no run-time space overhead (if ccObjectInfo and ccUnwind are non-virtual, the right choice anyway). A macro, cmObjectInfoDcl, is provided that allows any class to override ccObjectInfo's virtuals in the class definition. The actual definitions are placed out of line in with the cmObjectInfoDef macro.

This redefinition is required in unwind-constructed classes, and I further recommend that it be included in all non-trivial classes we write. The member functions created by expanding the macro are not declared virtual, so that the macro will never add storage for a vtbl pointer to a class that doesn't already have one by virtue of having ccObjectInfo as a (possibly indirect) base. For those classes where the 'virtual-ness' is desired, they can be declared so by hand in the root of that hierarchy.

ccObjectInfo has benefits beyond exception handling—it has been very useful in debugging, because one can identify objects at run-time without knowing their type at compile time and provides print/dump facilities throughout the VCL.

The following statements are true given the currently specified mechanism (proof left as an exercise):

1) Testing an object for membership at construction time (to avoid linking on the unwind list) only works if the member object is constructed after the switch point.
2) Testing an object for membership at throw time, assuming all objects are fully constructed (to skip over the destructor), works regardless of switch point.

3) Destruction of partially constructed objects (constructor does a throw) only works if all member objects are constructed before the switch point.

Clearly, the current mechanism will work only if we test for membership at throw time and if all member objects are constructed before the switch point. Cfront 3.0 constructs member objects after the switch point, and anyway it's implementation-dependent as discussed above.

We must find some way to effectively prohibit throws in constructors and yet satisfy functional requirement #5. The answer is to allow them, but install a catch of ccSignal::all at the beginning of every constructor so that the throw does not propagate outside of the constructor. If a signal is caught it is remembered, and then we go through the motions of constructing the rest of the object, postponing the throw until it is safe to do. Going through the motions means allowing construction to continue, but arranging that each constructor body returns immediately without doing anything. Once the object is "fully constructed", the throw of the remembered signal will cause it to be destroyed immediately. Once again we go through the motions of destruction, until we reach sub-objects that are fully constructed at which point we switch real destruction back on.

This is all done with the cmCStart and cmDStart macros as described in the complex-constructed rules above, and is actually much simpler and faster than it might sound.

A static counter "errorSkipLevel" is defined. If a signal is caught by the catch installed by the macro cmCStart, errorSkipLevel is set to 1. If the object is not a member of another object, the signal is re-Thrown immediately, otherwise the signal is remembered and the constructor returns, allowing "construction" to continue.

On constructor entry, errorSkipLevel is tested. If it is zero construction continues normally. If not it is incremented, and if the object is not a member of another object the remembered signal is thrown, otherwise the constructor returns.

On destructor entry, errorSkipLevel is also tested. If it is non-zero it is decremented and the destructor red, urns immediately.

This mechanism works regardless of: switch point, but for subtle reasons. If a member object constructed before the switch point does a throw, it will not be considered a member because the ccObjectInfo virtuals in the base classes of the complete object don't yet know about the complete object. "Construction" will not continue—all sub-objects constructed so far will be destroyed immediately. This works because the virtual destructors in the ccUnwind base classes also haven't been switched yet to destroy the complete object. If a member object constructed after the switch point does a throw, it will be considered a member, arid we will "construct" the rest of the object. When the postponed throw is finally done, we will correctly skip the member objects at the head of the unwind list, and use the destructor of a base to destroy the entire thing. Note that once the switch point has been passed during construction, the object must be switched back to destroy the bases or incorrect behavior will result. The code to switch back exists only in the destructor for the complete object, so calling the complete destructor is mandatory.

Note that while going through the motions of construction and destruction, simply-constructed objects will actually be constructed, and unwind-constructed and 3rd party objects in a complex-constructed wrapper will actually be constructed and destroyed. This should be OK.

I struggled hard but in vain to avoid the need to use cmCStart and cmDStart, and to a lesser extend ccObjectInfo. Once I gave up trying, I began to rationalize. First, most classes will be simply- or unwind-constructed. Second, the discipline of writing ccObjectInfo, cmCStart, and cmDStart into complex classes gives us almost complete freedom to modify the construction/destruction behavior of such classes in the future without having to edit all of our header files. For example, if we need some action to happen on normal exit from constructors, we make a class with a destructor that does the action, and declare an object of that class in cmCStart.

9. Unresolved Issues

Destruction of partially constructed automatic objects in general cannot be handled entirely by any exception handling mechanism. The above scheme guarantees that an object's destructor body will not execute unless its constructor finished, i.e. returned normally. If, for example, the constructor's job is to allocate 2 heap objects and we run out of memory on the second one, the constructor itself must insure that the first block is deleted. This situation is similar to the case of a function that wants to allocate and return some heap object, but must insure that the object is deleted if the function is aborted by a throw.

These cases can be address by the use of a set of handle classes; see the file handle.H.

A related but perhaps more serious problem is the destruction of partially constructed non-automatic objects. Destruction of fully-constructed non-automatic objects must be the complete responsibility of the programmer, but if construction of such an object fails, how can the programmer know what sub-objects were constructed, and what could he do about it anyway? Perhaps such an object must be considered automatic until it is fully constructed, at which point it is somehow removed from the unwind list.

Finally, I have not considered asynchronous throws, such as keyboard or timer aborts. We have two choices:

1) wrap software lock and unlock functions around sections of code that cannot be interrupted; and 2) check for such conditions at various safe points in the code.

With #1, programming mistakes can fatally destroy system integrity; with #2, infinite loops can be fatal. The current system is undefined with regard to asynchronous throws and the user is advised to beware.

10. Caveats

Because signal objects have static storage class, care must be taken during static initialization to avoid using signals defined in other compilation units.

This is because C++ does not define the order of execution of static initializers among different compilation units. During initialization of module A, there is no guarantee that a particular signal object of another module B has been initialized, so any exception activity involving module B's signal object might fail.

Shapes

The following files are discussed:

$onsightDEFS/shapes.H $onsightSRC/geom/shapes.C

Shapes.C consists of a number of classes that manipulate and draw basic shapes. Although it's used primarily by planeFigures.C to make handled region classes, shapes are general purpose classes. To make the classes as efficient as possible they do not use any unnecessary inheritance. Some classes derive from ccUnwind (and use cmObjectInfoDcl) because they are complex constructed and must follow the proper exception handling rules. Shapes do not derive from a common base class because the differences between the classes does not warrant it. The same names are used between classes to indicate the same functionality. Classes defined in shapes.H are for applications where instances of specific shapes are needed. The classes in planeFigures.H are used when generic shapes are specified.

Shapes are stored as real numbers (doubles, ccRadian, . . . ) and most parameters can take on any value. Points, Lines, etc . . . are represented exactly (or as exact as a 64 bit double can). The drawing routines in graphics.C convert the real values to integer for drawing in a cip_buffer.

Vector manipulations are used heavily in all of the code to simplify its design. The reader must be well (I repeat WELL) versed with vector manipulations to follow what the code does. The source contains comments where appropriate.

Q: Why are the default constructors empty?

A: In this implementation you can create an uninitialized instance of any shape. There is nothing to stop you from using this object before it is initialized. This is the same behavior as any built-in C++ type. I thought about adding a mechanism to detect the use of an object before it is initialized. I decided that it wasn't worth it for a couple of reasons. First, most routines use the handled versions of these classes (for instance, ccRectHdl instead of ccRect). Second, making an object bullet-proof is difficult for classes like ccPoint since it derives from ccFPair. ccRect throws an error if an operation is attempted on an uninitialized object. This behavior was prompted because the intersection of two ccRect's can produce a null ccRect.

Q: How are argument calling and return types decided?

A: A class typically takes as an arguemnt the base class object so the function works for either the base class or derived class. As far as return types, the derived class is returned so its value can be used either way. For instance:

ccPoint ccLine::intersect (const cc2Vector&) const;

can be called with either a cc2Vector or ccLine and returns a ccPoint or ccFPair.

Q: Why does ccLine derive from cc2Vector and ccPoint doesn't?

A: Pattern of usage. Points are used extensively throughout the system and are designed to be very efficient, Lines are less frequent so deriving them from cc2Vector makes sense because of the amount of code reuse possible, Work TBD:

Remove comments around repInvariant when they are all complete. Extend checks for ccEllipse Check the construction of an ellipse from its coefficients. Make sure that the desired degenerative forms are allowed.

Member functions available with most/all classes
double distToPoint (const ccFPair&) const;

Compute the distance from the shape and the specified point. The distance is zero only along the boundary of the object.

int within (const ccFPair&) const;

Returns true if the specified point is on or within the shape. This member function is available for ccRect, ccCircle, ccEllipse and ccGenRect (and ccEllipseArc through inheritance from ccEllipse).

ccRect encloseRect () const;

Returns the enclosing rectangle of the shape. This member function is available for ccRect, ccCircle, ccEllipse and ccGenRect (and ccEllipseArc through inheritance from ccEllipse).

void draw (const ccDisplay&, ccGcw=ccGcw::deflt) const;

Draw the shape on the indicated display (ie: cip_buffer).

ccPoint

A ccPoint is stored as a ccFPair (actually, ccPoint derives from ccFPair so all ccFPair member functions are available to users of ccPoint). There are no restrictions on where a ccPoint can be located. Points can be constructed from two reals, a ccFPair (and hence another ccPoint) or a cc2Vector.

ccPoint map (const ccCoordXform& c) const;

Map the point under coordinate transformation into a new ccPoint.

ccPoint midPoint (const ccFPair&) const;

Computes the location of the midpoint between two ccPoints or a ccPoint and ccFPair.

ccLine connect (const ccFPair&) const;

Computes the line that passes through two ccPoints or a ccPoint and ccFPair. If the two ccPoints are equal, a cc2Vector exception gets thrown (cc2Vector::noAngle)

ccLine bisect (const ccFPair&) const;

Computes the line that is the perpendicular bisector between two ccPoints or a ccPoint and ccFPair. If the two ccPoints are equal, a cc2Vector exception gets thrown (cc2Vector::noAngle).

ccLine ccLine performs many subtle operations on lines. The source code contains a description of the problem and how to solve it. A line is stored as a vector from the origin to a point on the line such that the vector is normal to the line. Polar coordinates can easily store the representation of any line with one large exception. Any line that passes through the origin is stored as a vector of radius zero and appropriate direction. The direction can be one of two values (separated by 180 degrees from each other). cc2Vector supports the notion of a pseudo-null vector to handle this need. However, many member functions (such as map()) must guarantee that their formula works for pseudo-null vectors as well as for the general case.

ccLine derives from cc2Vector so access to all cc2Vector member functions are available. Construction of a ccLine requires a cc2Vector (or another ccLine).

ccLine map (const ccCoordXform& c) const;

Map the line under coordinate transformation into a new ccLine. In general, mapping a ccLine can produce a ccPlaneFigure. However, a simplification is made to guarantee a ccLine is created. See the source code comments for more details.

ccRadian angle (const cc2Vector&) const:

Return the angle between the line and the specified vector (or line). The angle is measured from the vector to the line.

ccRadian angle () const;

Return the angle of the line. This is redefined because the above angle definition hides the cc2Vector::angle() definition.

ccPoint intersect (const cc2Vector&) const;

Computes the intersection point of two lines. The signal ccLine::intersectParallel is thrown if the lines are parallel.

ccLine parallel (const ccFPair&) const;

Compute the line parallel to the current line that passes through the specified point.

ccLine normal (const ccFPair&) const; Compute the line perpendicular To the current line that passes through the specified point.

ccLineSeg ccLineSeg stores two points (ccPoint's) which define the segment. A degenerative line is one whose line segment is actually a point.

ccPoint p1 () const;
ccPoint p2 () const;

Returns the first or second stored point associated with the line segment. The ordering of the points is not important.

ccPoint p1 (const ccFPair& p);
ccPoint p2 (const ccFPair& p);

Changes the location of one of the end points of the line segment.

ccLineSeg map (const ccCoordXform& c) const;

Map the line segment under coordinate transformation into a new ccLineSeg.

int degen () const;

Returns true if the ccLineSeg describes a point.

double distToPoint (const ccFPair& p) const;

Compute the distance between the line segment and the specified point. Depending on where the point is located, the return value can be the distance from the point to one of the end points or the distance along the perpendicular line passing through the point.

ccLine line () const;

Compute the line which passes through the line segment. The exception degenLineSeg is thrown if the line segment actually describes a point.

ccRect ccRect stores the lower-left point and the width and height of the rectangle. Negative width and height values cause the lower-left point to be moved to make the values positive. A zero width and height describes a degenerative point. The intersection operator (&) forces the class to have a level of protection against access of an uninitialized ccRect. The intersection of two non-overlapping ccRect's is a null ccRect. Trying to access or manipulate a null ccRect causes a nullObject error. I was sorely tempted to punt this issue entirely and return an uninitialized ccRect.

int isValid () const;

Returns true if the ccRect is not: null and is initialized.

ccPoint ll () const;
ccPoint lr () const;
ccPoint ur () const;
ccPoint ul () const;

Return the various corner points of the rectangle.

ccLineSeg lSeg () const;
ccLineSeg rSeg () const;
ccLineSeg tSeg () const;
ccLineSeg bSeg () const;

Return the various line segments which make up the rectangle.

ccFPair sz () const;

Return the width and height as a ccFPair.

ccGenRect map (const ccCoordXform&) const;

Map the rectangle under coordinate transformation into a new ccGenRect.

int degen () const;

Returns true if the ccRect describes a point.

ccRect enclose (const ccRect&) const;

Computes the minimum enclosing rectangle of two ccRect's. This is not the union (which is normally not a rectangle).

ccCircle ccCircle stores the center of the circle and the radius. Although a circle is nothing but a special case of ccEllipse, the member functions are easy and execute quicker than ccEllipse. A negative radius value causes a badRadius exception to be thrown. ccCircle derives from ccUnwind because the constructor can fail (for a negative radius).

ccPoint center () const;
double radius () const;

Return information about the current circle.

ccEllipse map (const ccCoordXform& c) const;

Map the circle under coordinate transformation into a new ccEllipse. This function lets ccEllipse do all the work.

ccEllipse

A ccEllipse stores its internal state in geometric form (ie: center, major/minor radii, rotation). However, an ellipse can be generated using multiple descriptions. Consult the source for more documentation.

Geometric Description

The geometric description consists of the center, major/minor radii and rotation. The ccEllipse constructor takes a ccEllipseGeom as argument which contains the parameters. The constructor will throw ccEllipse::badGeom if either radii is negative. A degenerative ellipse (a point) is allowed mainly because a ccGenRect uses ccEllipseArc's for the rounded corners. If these rounded corners are actually square, the ellipses are points.

Unit Circle Description

This description consists of the center and a matrix. The matrix contains the transformation necessary to turn the coordinates of the ellipse into the unit circle centered at the origin. A degenerate ellipse (both radii=0) is formed if the matrix determinant is 0. The ccEllipse constructor takes a ccEllipseUnit as argument.

Coefficient Description

The general form is:

$$ax^2+by^2cxy+dx+ey+f=0$$

where:

$c^2-4ab<0$ (See CRC Math Handbook 27th Edition, pp 196–197)

and:

An ellipse rather than a parabola or hyperbola is defined.

If an error is detected during construction, ccEllipse.bad-Coef is thrown. The ccEllipse constructor takes a ccEllipseCoef as argument. The constructor will not construct a degenerative ellipse.

ccEllipse derives from ccUnwind because the constructors can fail.

ccEllipseCoef getCoef () const;
ccEllipseGeom getGeom () const;
ccEllipseUnit getUnit () const;

return a description of the ellipse in any of the three supported formats.

ccPoint center () const;

Return the center of the ellipse.

int degen () const;

Returns true if the ellipse is degenerate (both radii=O).

ccEllipse map (const ccCoordXform& c) const;

Map the ellipse under coordinate transformation into a new ellipse.

double distToPoint (const ccFPair& p) const;

This computation is only approximate for a ccEllipse. The distance is defined as from the point to the ellipse along the line passing through the center.

void dump (ostream& out, int i=0, int j=0) const;

Display the ccEllipse in all three representations.

ccEllipseArc

A ccEllipseArc derives from ccEllipse and contains start/stop phase angles. Consult the header file for more information on how the phase angles can change under coordinate transformation. When the start and stop angles are equal the entire ccEllipse is used. ccEllipseArc derives from ccEllipse.

ccRadian phi1 () const;
ccRadian phi2 () const;

Returns the current angles that make up the arc.

ccEllipseArc map (const ccCoordXform& c) const;

Map the ellipse arc under coordinate transformation into a new ellipse arc. This operation is much more complicated than it appears because the unit circle representation is overdetermined by one degree of freedom. This can cause the not only the ellipse but the phase angles to change.

ccGenRect ccGenRect consists of a ccPoint (center), ccLineSeg's (outline) and ccEllipseArc's (rounded corners). In a manner similar to the unit circle representation of ccEllipse, ccGenRect uses a unit rectangle description to generate a ccGenRect (along with center and corner roundness). The geometric construction takes the center point, major/minor radii, rotation and corner roundness. A ccRect and ccEllipse can be converted into a ccGenRect. The exception badRadius is thrown if any radius<=0. This includes the construction of a ccGenRect from a ccRect.

ccGenRect derives from ccUnwind because the constructors can fail.

ccPoint center () const;
cc2Matrix U () const;
ccFPair radii () const;
ccRadian orient () const;
ccRadian skew () const;
ccFPair round () const;
ccFPair uround () const;

Return parameters that describe the current ccGenRect.
ccGenRect map (const ccCoordXform&) const;

Map the ccGenRect under coordinate transformation into a new ccGenRect. The map() function is very similar to that for ccEllipse (ccEllipse is a special case of ccGenRect).

Handles

Overview

Handles are a set of classes that provide a shared representation to classes that otherwise may not be able to rely on the intrinsic C support for stack objects and pointers. They provide a shared representation, allowing for fast copy and assignment operations especially for large objects. Handles also allow multiple references to the same objects, avoiding the dangling reference problem. Handles are a VCL analogue to C pointers in that they refer to data, copies of a particular handle refer to the same data, and so do handle arguments. Handles are references, so handled objects exhibit copy by reference semantics in function definitions, not copy by value.

Handles supplant the creation, assigment and copy operations of a class. The system requires a class that holds the actual representation (a _rep_ class) and a class that forwards the operations on the rep class from the reference (a _handle_ class). Only the appropriate handles may access the rep class, no client of a handle class may ever see the rep directly. By convention the rep class tag name is the type name prefixed by "cc_" and the handle class's is the type name prefixed by "cc". Note that only the handle class's name is visible to the client. In particular, no access to the rep class is allowed, outside of the handle class. There is no "back door" to the representation of the type.

Handle memory management is provided by reference counting on the representations. When a representation no longer is accessible through any valid handle, it is destroyed (finalized). Objects of the rep class must have lifetimes across arbitrary function call stack frames. The cmBlock{Store,Def} macros are provided for the simple cases-no heap memory used in the rep class, etc. In any case the rep object must be allocated anywhere you create one in the implementation of the rep or handle classes with the member function alloc. Further, all finalization activity must be enclosed in the cleanup member function. Use of the block storage methods is highly recommended until the author is very familiar with their operation.

Objects of the handle type may have an uninitialized state. This can be tested for explicitly. Handle objects typically contain no data outside of that inherited from the base class; almost all intelligence for the operations of the type is enclosed in the rep class, together with the data representation for the type.

Operations

Handles supply only two operations beyond taking care of copy, assignment, and the usual memory bookkeeping: the member function int isInit() and the right arrow selector operator, '→'. One operation is available as derived from ccHandleBase, int refc().

The right arrow selector is provided to access members and data from the rep class. As expected according to C++ rules, the only names that can appear on the right hand side of this operator are those that are member names of the rep class. These follow all access rules of the rep type.

```
class cc_MyType {
public:
    void foo ( );
private:
    void bar ( );
};
// ....
ccMyType   batman;
// ... initialize batman;
batman->foo( );      // calls cc_MyType::foo on the data
                     // batman refers to.
batman->bar( );      // error, no access to cc_MyType::bar
```

If the handle is not initialized and the right arrow selector is invoked on it, the signal ccHandle<rep class>::uninitialized, is thrown.

This operator is the primary access to the rep class and is used to access the members explicitly. Members that are called implicitly require forwarding from the handle type itself. These fall into three categories: constructors, operators (as in 'operator >' or 'operator unsigned long ()') and signals that the rep class might throw.

The isInit () function is supplied to allow checks for a valid handle.

```
ccMyType   batman;
//...
if (batman.isInit( ))
{
    // handle referes to valid data
}
else
    // batman is uninitialized
```

The refc operation returns the current reference count. This will always be at least one, signifying the reference through which the member was invoked. It is supplied as expository information, possibly of use in profiling or in space optimization.

Handles lose information about inheritance relationships of the classes being handled. A class Z_rep is publicly inherited from Y_rep. The handles Z and Y are created to reference them. Unfortunately, a handle reference to Z cannot be coerced to a handle reference to Y, To work around this problem, user defined conversions must be explicitly created in the handle classes to convert back and forth. A set of macros in handleBase.H "eases the pain somewhat"— cmBaseHandleDcl, cmBaseHandleDef, cmDerivedDcl, cmDerivedDef.

A standard form for rep/handle definitions looks like this:

```
// MyType.H
#ifndef __handleBase__
#include <handleBase.H>
#endif
#ifndef __handle__
#include <handle.H>
#endif
#ifndef __exception__
#include <exception.H>
#endif
class cc_MyType : public virtual ccHandleBase {
public:
    /// VCL declarations
    cmObjectInfoDcl;
    cmPrintDumpObj;
    cmStdFriend (    MyType);
    cmBlockStore (cc_MyType);
    /*  Rep classes cannot have stack storage. cmBlockStore is a
        convenient way to declare the required alloc and cleanUp
        methods that ccMyType and cchandle will use. Simple classes
        can use the cmBlockDef in handleBase.H to define storage.
        Classes that use heap storage should define these members
        themselves, but might use cmBlockStore to declare members.
    */
    /*  All member functions go here, except constructors and
        operators. All should return ccMyType (never cc_MyType).
    */
};
class ccMyType : public ccHandle <cc_MyType> {
public:
    // VCL declarations
    cmStdHandleDcls (MyType);
    /*  All constructors go here. All operator functions need to
        be declared here to use ccMyType. Note that it is often
        convenient to inline forward calls to these operators to
        functions in the rep class (cc_MyType). All signals that the
        user might want to catch must be declared here. */
    /*  You should not declare copy constructors or assigment operators
        for the handle class. If the abstraction is mutable, you
        should to implement a deep copy operation. */
    /*  Remember to follow the exception/ccUnwind rules for
        constructors--any handle is at least unwind-constructed by
        virtue of its base class.*/
};
// MyType.C
/// VCL definitions
cmStdHandleDefs (MyType);
cmBlockDef (cc_MyType, defaultBlockSize);
cmObjectInfoDef (cc_MyType);
const ccObjectInfo& cc_MyType::repInvariant (int) const
{
        // This must be supplied by the author, declared
        // in cmObjectInfo of cc_MyType.
        ccHandleBase::repInvariant( );
        return *this;
}
// End of files
```

Implementation Notes cmBlockDef cannot be used for rep classes that new or {m,re,c}alloc data. cmBlockStore often can be used to declare the requisite class members, and is recommended for use if possible. These macro definitions reside in handleBase.H The cmStdHandle(Dcl,Def) macros do not work for handle class that are themselves templates, because the form of a member definition must itself have the template parameter declarations. Use the form of the corresponding macros in handleBase.H to write your own definitions, according to the template parameters of your class. See list.H for an example. All of the members in these macros are required for operation of handle types.

Signals the the rep class throws must be declared in the handle class. The rep class namespace is off limits to the user, and so, like operators, signals need to be declared in the handle name space.

There is a known Cfront bug that affects these definitions for template handle types. The compiler (3.0.1) rejects the following definition (cmDefUninit):
template <class T>
ccHandle<cc_SomeTemplateType <T>>::uninitialized ("name");

The Base/Derived macros (cm{BaseHandle, Derived}{Dcl,Def}) are used to have the handle class simulate the class heirarchy available in the rep class derivation tree. The concept involved is that a handle, typically the derived type, can be converted (if setup with these macros) to another handle type. If the conversion would be legal under the rep class derivations, the handle points to the original rep object and all calls through operator → () are routed through the virtual functions as expected. If the conversion is not valid, the handle remains uninitialized, which should be checked for with the int isInit() member function. For explicit usage and example, see the Xform classes in the VCL math module.

The macros cmStdHandle(Dcl,Def) define several constructors, the destructor, and the repInvariant function for the handle class. In this constructor the cast is needed:

ccMyType::ccMyType (const cc_MyType & n):
    ccHandle<cc_MyType>((cc_MyType&) n) { }

This declaration supports the Base/Derived macros, which do what amounts to a checked cast. If this constructor were defined this way:

ccMyType::ccMyType (cc_MyType & n):
    ccHandle<cc_MyType>(n) { } the compiler would give an error regarding the passing temporaries (from the Base/Derived macros, with the ccHandle constructors) by a non-const reference. This is an valid error in C++ (ARM, 8.4.3, p.154, but see X3J16 91-0059/8.4.3 para. 6 on lifetimes).

The replacement of an implicit conversion to int with the member int isInit() was made to avoid interfering with a handle type's ability to define a meaningful implicit conversion to int of their own (May 7, 1992).

The cmDefUninit macro has been removed, and the signals used by the handle defined in cmStdHandleDefs. A macro definition of these signals is preferred to a stock definition in handle.C because this allows the name of type T to appear in the name string of the signals ccHandle<T>::uninitialized and ccHandle<T>::internal Error. The cmDefUninit is defined to be null for the convenience of current code (May 7, 1992).

The unused static function makeSignalName has been removed (May 7, 1992).

The cmBlockStore macros define a cleanup function, which is a required name for this member (per the ccHandle-Base definition). The name of the member function allot is arbitrarily chosen for cmBlockStore. Clients providing their own memory management must then provide a cleanup member, but may choose other names for anything else.

Images
Image Documentation
The following files are discussed:
$localDEFS/image.H
$localVCL/image/image.C
Introduction ccImage is a handled class (ie: handle class=ccImage, rep class= cc_Image). It provides a replacement for the cip_ buffer structure and adds a number of new features. cip_ buffer's are not eliminated entirely because some vision tools still require cip_buffer images as arguments.

Images can broadly be described as having the following attributes:
shape
    rectangular, arbitrary
pixel depth
    8,16,32, arbitrary
pixel storage
    regular, packed, synthetic
Most combinations of the attributes are possible, making the class design somewhat complex.

Image Properties (at least the important ones)
    Arbitrary shaped images.
    Intersection is used to create a window of another image
    Optimized storage of pixel data
    Existing routines that use cip_buffers can be used
    Gray level values are signed integers
    Simple image algebra available
    Region coordinates are signed words
    Images use a RAT to support all frame grabber formats
    An RDT (row difference table) is also supported
    Addressable pixel sizes 8,16, 32 bits
    Other pixel sizes (1,2,3,4,5,6,10 bits)

cc_Image is a pure virtual function. Derived classes must supply:
    get ()
        Read indicated pixels
    put ()
        Write indicated pixels For now, the _rat and _rdt are not arrays. I did this for speed. It's trivial to change it to ccArray if needed. Another reason for avoiding a ccArray was in case I wanted to write some routines in assembly. Since I needed to store the pixel depth for sizes other than 8,16 and 32, I decided to always store the depth. This allows external routines to be written which can determine the pixel depth and take appropriate actions. Rep classes take a fair amount of room so an additional variable won't bother anybody.

Images are not restricted to storing grey values from 0 to 2^N−1 where N is the number of bits per pixel in the image. An optional field allows the value for the lowest grey level to be set to any valid signed value. The pixel data is still stored as 0 to 2^N−1 except that the get and put routines add this offset in.

Major Storage Types (see image.H for more detail)

| | |
|---|---|
| validRat | The rat is used to access pixel data. The formula is : address = rat[y + yoffset] + (x + xoffset). For images that own the storage, xoffset=yoffset = 0 |
| packRat | Arbitrary images that are not stored on a frame grabber are packed whereby the first pixel of line N immediately follows the last pixel for line N-1 (except for padding constraints for some pixel depths). The ROI runs are used to compute the actual offset from this address. To be consistent with other images, the rat describes the address of pixels aligned vertically with the llc( ) of the enclosed rect. It's possible that the RAT will point to addresses which are not part of the image, but when the coordinates from the ROI are added in, the address will be correct. |
| regular | The image has a valid RAT with the row address difference being constant. This is consistent with the FAST8 |

| representation of a cip_buffer. |
|---|

There's an added complexity when complex images such as an annulus are stored in packed format. You cannot simply use the RAT equation shown above and get the correct answer for anything other than the first run in each row. The second (and subsequent) runs in each row must use the ROI information to compute their next address. The get/put functions will properly deal with this behavior. Assembly routines can throw an error if they are asked to process an image of this type.

RAT storage

The row address table (RAT) is always needed to access pixel data. There are 3 descriptions of exactly what the RAT points to, depending on image type. It's important to understand why each is needed.

Alignment issues are less severe than the existing Cognex library. Since arbitrary images REQUIRE the use of the rat (or rdt) to access the pixel data, alignment is important for a row's worth of data, but not between rows.

Alignment is at long-word boundaries to properly support packing of pixel depths that are not multiples of 8. This does waste some space but I'm not worried about this at present. It might be better to do some other alignment for 8,16 and 32 bit images, but I'll leave this as a future assignment. Word alignment might be preferred because you can save some wasted space while still getting the efficiency of word and long-word access from word aligned data. This efficiency is slight (one clock cycle per access).

For windowed images, no alignment is guaranteed since the window reuses the data from its parent.

Rectangular and Windowed Images

Each RAT entry points to the first pixel in a row. Each row is long-word aligned (like the current Cognex library). The RAT equation is:

address=rat[y +yoffset]+(x+xoffset).

x,y are the coordinates of the desired point, relative to the lower left hand corner of the MER (this is how runs are stored too)

xoffset and yoffset represent the offset from this MER and a parent's MER. xoffset and yoffset will be non-zero if an image is a window of another image.

The region can be arbitrary as long as it's a window of an image whose storage is rectangular.

Simple Arbitrary Packed Images

I define simple arbitrary images as one whose region is a simple shape. Regions which are disjoint or regions with multiple runs per line are complex images.

Packed images store only pixels that belong to the image (with some padding). The RAT equation used is identical to above. However, each RAT entry does not point to the first pixel in a row. The RAT describes the addresses along the left hand column of the MER, so it can point to memory which is not part of the image. Valid addresses are always generated when (x,y) coordinates belonging to the region are used.

Complex Arbitrary Packed Images

A simple equation cannot be used to compute the address of images of this type. Note that an image that has discontinuities can use the above formulas if the image only has 0 or 1 runs per line. However, I'm still going to consider them part of this group.

Like above, the RAT can point to memory which is not part of the image. Since multiple runs may exist for this row, the location of the pixel must be determined by examining the runs to compute an offset from the start of the row.

Computation of cip_buffer's

There are two ways a cip_buffer is generated, depending on whether the ccImage is rectangular or not. For rectangular regions, a cip_buffer is created whose RAT entries point into the storage of the ccImage. By manipulating the cip_buffer you are directly manipulating the ccImage. Attempting to import() the cip_buffer results in a nop.

An arbitrary image must be converted into a cip_buffer and it's data must be copied. The cip_buffer created is the size of the MER of the image. All pixels in the MER which are not in the image are set to grey value 0. This can be overridden as needed. The elegant way to compute the cip_buffer is to:

Create a rectangular image whose ROI is the MER of the arbitrary image (using ccROI:minEnclRect() to compute the new region)

set the pixels in this image to the desired value

Copy the pixels from the arbitrary image into the rectangular image

Extract a cip_buffer from the rectangular image

It's much faster to:

Create a cip_buffer whose size is the MER of the arbitrary image set the pixels to the desired value with cip_set Read a rows worth of pixel data using cc_Image::read (usually overridden by the derived classes)

Write a rows worth of pixel data to the cip_buffer (using cc_Image::writeCip)

The cc_Image::import() function is used to copy back a cip_buffer into an existing ccImage. The size of the cip_buffer must match the size of the MER of the image.

The cip_buffer computed is cached so that it is calculated only once. Changing any information in an arbitrary region will cause it to become invalidated.

Null Images

Null images represent an image that have no pixel data or have no region. Null images are usually formed in one of two ways:

By construction of an image from a null region.

By intersection of an image with a null region.

There is no good Cognex library analog. If can create an image with 0 size using cip_create(), you get a CIP_ERR_PELADDR when you attempt to access pixels. The cip_window() function does not allow construction of a null cip_buffer (it throws CGEN_ERR_BADARG).

cc_NullImage throws the signal ccImage::nullImage when any pixel access to it is made. All parameters are set to zero.

Hierarchy

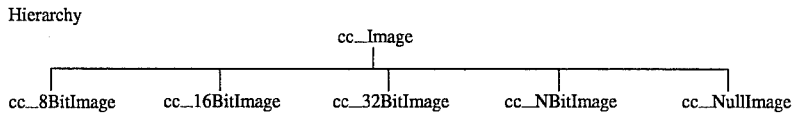

Member Function Description

These are member functions of the rep class. Included is 10 their current status (as of Dec. 14, 1992)

---

Image Creation ccImage::ccImage (cip_buffer* src, ccRCPair origin);  DONE
    Construct a ccImage from a cip_buffer. The origin of the image is
    set to origin (defaults to 0,0)
ccImage::ccImage (const ccROI& r, short depth = 8);  DONE
    Constructs a ccImage from the specified ROI. The depth of the image
    defaults to 8. This is analogous to cip_create( ).
ccImage::ccImage (Carroll's acquisition code)  NO
ccImage like (short depth = 0);  DONE
    Create a new image with the same size and pixel depth as the current
    image. The depth of the new image can be overridden.
ccImage changeDepth (short depth);  DONE
    Returns a copy of a ccImage but with a different depth.
ccImage copy (ccImage& dst = null);  DONE
    Copy the current image (region and pixel data) to the indicated
    destination image. If the desitnation is null, the routine
    creates the image. If the destination is given, the information
    copied is limited to the intersection of the image and destination
ccImage operator & (ccROI& r) const;  DONE
    Compute the window of the current image by intersecting the region r
    with the current region. The RAT of the parent is reused by the child.
cip_buffer Related cip_buffer* cipBuffer (ccGreyValue background = 0);  DONE
    Returns a cip_buffer which describes the image. For rectangular
    images, the cip_buffer points directly to ccImage storage. For
    arbitrary images, the data is copied into a cip_buffer the size of
    the MER. The rectangle is padded with pixels of grey level
    background.
void import (cip_buffer* cip);  DONE?
    copies pixels from a cip_buffer into an existing image. This is the
    complement to cipBuffer( ) to return processed data. The cip_buffer
    must be the size of the MER.
Pixel access ccGreyValue get (ccRCPair) const = 0;  DONE
    Get the pixel at the indicated coordinates
ccGreyValue put (ccRCPair, ccGreyValue, int overflow=detect) 3' 0;  DONE
    Writes a pixel to the indicated coordinates. If the pixel value
    exceeds the size that can be stored, the overflow flag is used to
    decide if an error (pelSize) should be thrown or the data truncated.
void read (ccRCPair, int count, const ccGreyValue&) const;  DONE
    Reads up to a lines worth of data.
void write (ccRCPair, int count, const ccGreyValues*, int overflow);  DONE
    Writes up to a lines worth of data. If the pixel value
    exceeds the size that can be stored, the overflow flag is used to
    decide if an error (pelSize) should be thrown or the data truncated.
Projections ccFn histogram (ccFn dst = nullFn, ccFn map = nullFn) const;  NO
    Compute the histogram of the image under the specified pixel map
    (defaults to a null map) and writes it to the specified destination.
    If the destination is null, a ccFn is created and returned.
ccFn gridProject (double tanTh, ccFn dst = nullFn, ccFn map = nullFn);  NO
    Project the image along a line at rotation tanTh with the specified
    pixel map (defaults to a null map). The output is written to the
    specified destination, if it exists, or one is created.

-continued

Image Processing

| | |
|---|---|
| ccImage sample (ccIPair avg, ccIPair skip, ccImage& dst = null);<br>Average and/or sub-sample the image. The avg defines a rectangle (given width and height) used to average pixel data. skip defines x and y skip parameters to sub-sample the image. If the destination is null, the routine creates the image. If the destination is given, the information computed is limited to the intersection of the image and destination. | NO |
| ccImage map (ccFn map, ccImage& dst = null);<br>Pixel mapping of the image. If the destination is null, the routine creates the image. If the destination is given, the information computed is limited to the intersection of the image and destination. | NO |
| ccImage add (ccImage src2, ccImage& dst = null, ccFn src2Map = nullFn);<br>Add the image to src2 (and optionally apply the indicated pixel map). If the destination is null, the routine creates an image the same pixel depth as the source image. The addition is limited to the intersection of the image and src2 (along with dst if specified). Overflows and underflows are ignored. | YES |
| ccImage sub (ccImage src2, ccImage& dst = null, ccFn src2Map = nullFn);<br>Subtract src2 from the image (and optionally apply the indicated pixel map). If the destination is null, the routine creates an image the same pixel depth as the source image. The subtraction is limited to the intersection of the image and src2 (along with dst if specified). Overflows and underflows are ignored. | NO |
| ccImage min (ccImage src2, ccImage& dst = null);<br>Compute an image whose pixels are the minimum of the two sources. If the destination is null, the routine creates an image the same pixel depth as the source image. The output is limited to the intersection of the two sources (along with dst if specified). | NO |
| ccImage max (ccImage src2, ccImage& dst = null);<br>Compute an image whose pixels are the maximum of the two sources. If the destination is null, the routine creates an image the same pixel depth as the source image. The output is limited to the intersection of the two sources (along with dst if specified). | NO |
| ccImage set (ccGreyValue);<br>Set all pixels in the image to the specified grey value. | DONE |
| ccImage expand (ccIPair mag, ccImage& dst = null);<br>Magnify the image by increasing the size of each pixel to the size specified by mag. If the destination is given, the information computed is limited to the intersection of the image and estination. | NO |
| ccGreyValue min ( ) const;<br>Returns the minimum value found in the image | NO |
| ccGreyValue max ( ) const;<br>Returns the maximum value found in the image | NO |
| ccGreyValue low ( ) const<br>Returns the minimum value this image can store. This image can be negative. | NO |
| ccGreyValue high ( ) const<br>Returns the maximum value this image can store. This image can be negative. | NO |

Misc

| | |
|---|---|
| int within (ccRCPair r) const;<br>Returns 1 if the specified coordinate is within the image. | DONE |
| ccCoordXform rawToPhy ( ) const;<br>Returns an xform to convert from raw (ccImage space) to physical (frame buffer memory) coordinates. | DONE |
| ccCoordXform phyToRaw ( ) const;<br>Returns an xform to convert from physical (frame buffer memory) to raw (ccImage space) coordinates | DONE |
| const ccROI& roi ( ) const;<br>Returns the region which describes the shape of the image | DONE |
| ccImage base ( ) const;<br>Returns the ccImage who owns the memory of the image | DONE |
| ccPixelAddr* rat ( ) const;<br>Returns a pointer to the RAT | DONE |
| ccPixelAddrDif* rdt ( ) const;<br>Returns a pointer to the rdt (row distance table) | NO |
| short depth ( ) const;<br>Returns the depth of the image | DONE |
| ccRCPair origin ( ) const;<br>Returns the current origin point (lower-left corner of the MER) of the image | DONE |
| void origin (ccRCPair org);<br>Sets the current origin point of the image | DON |

Problem Areas

1) A cip_buffer of an arbitrary region can exist which is not in sync with the image.

Example

Image A is a rectangular frame buffer image. Image B is computed as the intersection of Image A with some arbitrary region. A cip_buffer is generated from Image B. If the pixel data of image B is altered using put() or write(), the cip_buffer is correctly invalidated. However, if the pixel data of the parent is changed, the child image doesn't know it and will return the previously computed cip_buffer (which is incorrect) the next time the cip_buffer is requested.

2) Execution is slow. Think about optimizing 8-bit images first.

Graphics

The following files are discussed:

$onsightDEFS/graphics.H $onsightDEFS/gcw.H $onsightSRC/image/graphics.C $onsightSRC/image/newSplice.C Graphics consists of turning drawing requests from the user into entries on the Cognex graphics stack. The graphics stack allows non-destructive writing to the screen as well as eliminating screen flicker during updates. C++ classes are written to insulate the user from the graphic stack details (and from making mistakes). See the Advanced Graphics documentation for more information.

The graphic stack itself is managed by cc_GStack and ccGStack. Under the hood, cc_GStack is nothing but a wrapper around a cgr_stack_header*. The only reason that cc_GStack has a custom cmBlockDef is because the cgr_stack_header* is forced to zero in the constructor as well as cleanup(). Handles are used for the graphics stack for a couple of reasons. The stack can be the return argument from a function and avoid making a copy of the stack itself. The design also allows a single graphics stack to be used by several displays (this works ONLY if the two displays don't overlap each other).

The graphic stack consists of a number of cgr_stack_frame entries. A single screen object might be drawn as many cgr_stack_frame's. The class ccGStackMark is a wrapper around a cgr_stack_frame*. Since the graphics stack is a doubly-linked list of stack frames, ccGStackMark provides basic stack movement routines. Its main use is by ccScreenObj to reference the top and bottom stack frames used by the object. The id field in the graphic stack (whose use is reserved for the user) plays an important role. ccScreen accumulates drawing actions together so a single update() function can perform them all. The id field contains the screen update code (see screenObj.H for the codes). Part of the ccGStack ctor is a line that reads: "gs.h→bottom.id— 0". cgr_stack_init() sets this id equal to −1 which would indicate that all the flags are set (which leads to an error being thrown since the bottom element can't be removed).

Since you can't get at a cgr_stack_frame* directly (it's private), operator == and != are defined to compare the ptr values. The null argument ctor puts a zero in the frame pointer and means an uninitialized stack mark (ccScreenObj uses this feature to indicate a screen object that's not visible).

Graphic stack drawing requires a graphics control word (gcw) to maintain the color, drawing mode and control information for drawing. A default gcw (ccGcw::deflt) is maintained. See gcw.H and graphics.C for more information. An arbitrary gcw can be setup using one of the many overloaded ccGcw ctor's.

Drawing strings on the screen requires formatting information. The class ccStr holds the desired format and is an argument to the screen drawing function. The bit patterns for the formatting modes are designed to allow invalid combinations to be determined. For example, To specify a format for centering the string with the X axis expanded, the statement would look like:

ccStr myformat=ccStr::center|ccStr::expandH;

Color specification for drawing is provided by ccColor. For most applications, the static color definitions (ccColor::red for example) will suffice. ccColor does NOT initialize the RAMDAC LUT's. It only maps a color name to a particular gray value (0–15). The colors are arranged to allow an angle (hue) To be converted to a color (using the standard notation that 0 deg=red, 120 deg=green, 240 deg=blue, etc).

ccDisplay manages the display of graphics on the VP monitor. It maintains a ccImage and ccGStack. Member functions can be divided into three categories: member access, basic drawing routines and graphics stack.

A few points about using the graphic stack:

The global variable cgr_stack points to the current graphic stack. Functions that use the stack must setup this variable at the beginning of the function. For instance, all drawing routines setup this variable.

Stack splicing uses the function cgr_new_stack_splice() defined in newSplice.C rather than the Cognex libary cgr_stack_splice(). They perform in the same manner except that cgr_new_stack_splice is more efficient. Stack splicing moves a range of frames in front of a destination frame. Splicing a range of frames that includes the bottom element (associated with ccScreenBack, the fixed background) is an error. However, it is legal to splice items directly in front of the back item.

The functions mark(), bot() and top() were originally inlined functions. An MRI bug was found that screwed up many of these definitions. As a result, these functions are not inlined anymore. At some point they should be moved back to the header file.

The macro cmCLibCatch is used frequently to catch any Cognex library errors and convert them to C++ exceptions. There are situations where you cannot simply put the macro at the start of a definition. See catch.H for more information Why is ccDisplay::operator=defined?

The definition for operator=is The same code that the compiler would produce if you let it automatically define the assignment operator. The difference is that the assignment operator the compiler produces is inlined. This made debugging the ccScreen ctor difficult enough that I defined my own.

Why is ccGStack a handle class since in many applications only a single graphic stack is created?

Some functions return ccGStack from a function and in order to prevent a copy of the graphics stack from being made, a handle is used.

A number of enhancements to the code are pending:

Use ccString for drawing strings

Fully implement repInvariant() (cfront issues compiler errors in some circumstances)

Examine changeColor() function and underlying code to see what's going on.

Regions of Interest

1. Purpose and Goals

The purpose of this document is to specify a replacement for the current Cognex C library concept of image, represented by the structure cip_buffer and manipulated by various library functions. The principal features of the current implementation are:

1) An image is a 2 D array of unsigned integer grey values.
2) A variety of image types can be defined and used via a virtual function style interface. These types include 1, 2, 3, 4, 5, 6, 8, 10, 16, and 32 bit per pixel formats, as well as synthetic, read-only types where the grey values are the result of some computation on the pixel coordinates rather than being stored in memory.
3) The virtual function interface is too slow to be useful in most cases. Specific storage layouts are defined for use by high-performance C, assembly language, VC1, and VC2 routines.
4) The memory layout of pixels along rows in an image is fixed and can be hard-wired into high-performance code. For example, pixels along a row in an 8-bit/pixel image can be accessed using auto-incrementing addressing modes.
5) The bit alignment of pixels within a 32-bit longword is guaranteed to be the same for all pixels in an image column, so that each row can be processed based on the same pixel alignment parameters. This allows a single data-compiled routine to process the entire image.
6) The address of the start of each row cannot in general be calculated from the row number (y coordinate), but must be looked up in an table, the row address table (RAT). Some routines are written to require that the difference between the starting address of neighboring rows, the row address difference (RAD), be constant throughout the image. These routines must check the RAT and convert (by copying) the image if the RAD is non-constant.
7) An image can be constructed that is a subset of an existing image, by intersection with an oriented rectangle (ORECT). The new image is called a window. The window and the original image share memory.
8) A window is constructed in constant time (independent of image size)<50 µs.
9) There is no difference in representation between a window and a non-window image, so that all code that manipulates images can manipulate windows without any special case operation.
10) There is no difference between images in video memory and images in ordinary memory. We would like to keep as many of these features as practical, and add the following:
11) An image can be of arbitrary shape, and a window can be constructed by intersection with an arbitrary shape.
12) A non-rectangular image that is not a window of another image requires storage only for the pixels in the image (and possibly minor padding for alignment requirements), not its minimum enclosing rectangle.
13) Routines coded to use the current cip_buffer format will run on non-rectangular images without modification, using a common interface routine. The performance will be efficient but not optimal.
14) Grey values can be signed integers.
15) One can determine the original enclosing image of any window— the image that can be thought of as owning the storage.
16) Storage is managed automatically by use of VCL handles or equivalent.
17) A simple image algebra is defined, by means of operator overloading, to allow certain operations to be written in a convenient shorthand and making use of the automatic storage management.
18) Images will support caching of compiled results to allow greater flexibility in space-time tradeoffs, particularly for small images where the compiling overhead is significant.
19) The implementation is based on C++ language features.

We will probably have to give up on #8, at least in the general case, to get the new features. There is no pressing need to support other than 1, 8, 16, and 32 bit formats if that will save complexity or time. Feature #5 will be preserved, but may not be as much of a help as it was.

2. Definitions

The discrete image plane S2 is the set of ordered pairs of integers (x,y), such that $-2^{15}<x,y<2^{15}$. A region of interest (ROI) is a subset of S2. An image is a mapping from the elements of an ROI to an integer z, where $-2^{31} \leq z < 2^{31}$, or, equivalently, a set of triplets (x,y,z) such that (x,y) Î ROI. An element (x,y,z) of an image is called a pixel, the values (x,y) are called pixel or image coordinates, and the value z is called a grey value. The empty set is a valid ROI. These definitions may

LISTS

List

Description

A list is a mutable ordered collection of elements. Lists can have elements added or removed from the front or back. A list has a notion of current item and insertion and removal can be performed from there. Lists can be traversed in forward and backward order. Items on the list can be inspected.

This list is implemented with copy semantics. An insertion copies its argument into a storage space managed by the list. Copies are assumed to be inexpensive. This assumption is partially grounded on the existence of handles for more complex classes and the use of lists of pointers to objects. Note that elements must support copy operations. Also, lists are mutable, thus const lists are not supported. Furthermore, lists are handles, and thus have reference semantics when copied, etc. A deep copy operation is provided.

An auxilliary abstraction, ccListPlace, models places in the list. It has an association to the data element and a notion of position in the list. A pair of list places can therefore be used to specify ranges for subset lists, splicing, etc. A list place object is valid, in the context of a particular list, if it holds the position of an element that has not been removed from the list. Empty lists have equal front and back positions and are always at them.

The names of the various operations that deal with placement and traversal suggest that one goes to the front of a list and walks forward until the back of the list is reached, Similarly, one could go to the back of a list and and walk backward until the front of the list is reached, Operations See also the notes in listrep.H.

```
void addToFront (const T& elem);
void addInBack (const T& elem);
void addInPlace (const T& elem);
```

These are equivalent if the list is empty. The current element is unchanged. An add in place will insert the new element in front of the current element. An addition to an empty list sets the current element to the one added.
void removeFromFront (void);
void removeFromBack (void);
void removeInPlace (void);

These throw ccList<T>::empty if the list has no elements. The current element becomes the one just forward of the current if removeInPlace is used or removeFromFront is used when the current element is the front of the list. If the current element is the back of the list and removeFromBack is called, the current element is the new back of the list. Otherwise, the current element is unchanged.
void forward ();
void backward ();

Increments or decrements the position of the current element by one place in the list. Has no effect if the current position is already at the back/front or the list is empty.
void toFront ();
void toBack ();

Sets the position of the current element to the first or last element in the list, Has no effect if the list is empty.
T elem ();
T elemFront ();
T elemBack ();

Returns the current, front, or back element, as chosen by the selector functions. Throws ccList<T>::emptyList if the list is empty.
ccListPlace <T> place ();
ccListPlace <T> placeFront ();
ccListPlace <T> placeBack ();

This is a placeholder for the position of the current, front, or back element in the list. The list item can be queried for the value of the associated element, which is guaranteed to be valid although it may no longer be on the list. Throws ccList<T>::emptyList if the list is empty.
void replace (const T& _new_);

Replaces the current elements value with the value of _new_. Throws ccList<T>::emptyList if the list is empty.
int atFront ();
int atBack ();

Returns one if the current position is the front/back of the list; zero otherwise.
void comeHere (const ccListPlace <T> & _now_);

Selects the element whose position is held by _now_ as the the current. Throws ccList<T>::emptyList if the list is empty and ccList<T>::notIn if _now_ is not a valid position.
ccList <T> sublist (ccListPlace <T> _from_, ccListPlace <T> _to_);

Returns a new list that has a copy of the elements from _from_ to to_. Throws ccList<T>::emptyList if the list is empty, ccList<T>::notIn if any of the argument list items are no longer in the list. Note that no ordering is required on _from_ and _to_.
void splice (ccListPlace <T> _from_, ccListPlace <T> _to_, ccListPlace <T> _at_);

Removes the elements in the range from _from_ to _to_ and inserts them at position _at_. Throws ccList<T>::emptyList if the list is empty, ccList<T>::notIn if any of the argument list items are no longer in the list. Note that no ordering is required on _from_ and _to_. Currently not implemented.
ccList <T> copy ();

Returns a deep copy of the list. All elements are copied from the original list to the copy.

int len ();
Returns the number of elements in the list. Zero indicates an empty list and the return value will never be negative.
int empty ();
Returns one if the list has no elements; zero otherwise.
int member (const ccListPlace <T>& li);
Returns one if the li holds a position in the list; zero otherwise.
int ccListPlace <T>::operator== (const ccListPlace <T> & li);
Returns one if the list items hold the same position in the same list and point to the same elements; zero otherwise.
int ccListPlace <T>::isActive ();
Returns one if the list item holds any position in any list; zero otherwise.

Notes

The cmStdHdl macros cannot be used, so we test basic handle behaviour in the unit test file.

These lists are implemented as double linked, with a hidden structure that maintains a reference count, the pointers, and the value of the item. The reference count is both a count of references and a boolean value to determine if the item is on a list.

List places need some way to determine if they point to a value on the list that the user sends them to. The ccListItem::orphan, ccListItem::foster(), ccListItem::places, cc_List::_howMany, and cc_List::_id members take care of this. There is a modicum of mechanism to deal with the possibly obscure problem of requesting a list place on a list other than the one you got the place from. Nontheless, I feel the safeguards are well used if it catches it only once.

The place operations build a ccListPlace, which has a pointer to the appropriate list item. That list item increments its reference count. When the list place is destroyed, it decrements the reference count, and if it is zero, deletes the list item. List items are only built by the list itself. List operations that take listplaces use the cc_List::member function to determine if the list place is actually a place on that list. The cc_List::_id is compared to the ccListPlace::_which to see if it came from this list. The ccListItem::orphan of the list item that the list place points to determines if it is still a valid item on this list. (See cc_List::member for details). I chose not to use handles for this reference counting because there is more than simple reference counting going on. In particular, the reference that the list holds to the list item is more significant than any other reference.

Q: Why have a separate field for _id instead of using, say, the address of cc_List?

A: The list may have been destroyed since you got the place and another reallocated in that address (block store). Similarly, _id is reset in the alloc function to a new (unique) identifier and wiped out during the call to cc_List::cleanUp.

Q: Why have a field for ccListItem::orphan instead of searching the list to see if it is on it?

A: The list place may outlast the list it came from. Searching the list item's pointers, then, sends you into never never land. Especially once list items have block store, they may even point to valid list items on other lists! Also, the orphan field implements the ccListPlace::isActive function trivially. I suspect the cases where a list place outlives its target list are severely infrequent, but we *must* implement semantics for it. This is a consequence of having a list place as a first class type.

Since list items have reference counts that list places hold on to, list places must be unwind protected. When a list item is removed from a list, it must be de-referenced and possibly destroyed. If it is not destroyed (because it still is referenced) then we know a list place exists that holds a pointer to this item. Thus, we must foster it (setting the orphan flag).

Most of the other implementation details should be obvious from the code.

As for testing, lists have several interesting states: {0, 1, 2, more} elements. If it has zero elements, the head, tail, and current pointers are all null and the list is said to be empty. If it has one element, the head, tail, and current pointer all point to the single element. The two element case is interesting because it has only the head and the tail. Since head→prev is null and tail→next is null these head and tail are special cases, and with only two elements, there are no items that have valid both next and prev. More than two elements is a 'normal' case. Check the code for cc_List::repInvariant for an example of a loop that works on all these cases. These four cases are the glass box test cases for these functions.

Manual instantiation for lists is particularly onerous. Each list type instantiated creates five template files:

ccList <T> cc_List <T> ccListItem <T> ccListPlace <T> ccHandle <cc_List <T>>

The standard handle macros cannot be used for the handle definitions and declarations. See the handle documentation for implications.

Future Improvements

Block storage allocation for list items

Inline accessor member functions

Implement splice

Vectors

The public interface to the class cc2Vector provides as primitives vector addition, subtraction, scaling, and dot product. Also provided are member functions to extract x and y components, compute length and angle, and normalize to a unit vector. These latter functions can be defined in terms of the primitives (and the vector constants (1,0) and (0,1), but for efficiency and convenience they are brought out directly.

The implementation contains fields for both Cartesian components (x,y) and polar components (r,t), and flags to indicate which components are valid. The following table indicates the legal states and interpretation of the vector:

| x | y | r | t | meaning | |
|---|---|---|---|---|---|
| N | N | N | N | uninitialized | |
| V | V | — | — | Cartesian | N not valid |
| — | — | V | V | polar | V valid |
| 0 | 0 | — | N | null | — don't care |
| — | — | 0 | N | null* | 0 valid and value = 0 |
| 0 | 0 | — | V | pseudo-null | |
| — | — | 0 | V | pseudo-null | |

*currently illegal to simplify implementation

A vector can be represented with Cartesian or polar components as needed. An operation on vectors that produces a new vector will choose a representation for the new vector based on the operation type and representations of the operand vectors; the other components will be marked invalid. If an invalid component is needed, it will be computed and saved so that if needed again it does not have to be recomputed. This is the main reason for storing all this redundant information—to avoid recomputing often needed values. The ability to represent null and pseudo-null vectors is a useful by-product, but it could have been achieved in less space.

This table gives an indication of the amount of computation needed to do the vector operations with each representation:

| operation | Cartesian | polar | result |
|---|---|---|---|
| add, sub | easy | hard | vector |
| negate | easy | easy | vector |
| scale | easy | easy | vector |
| dot product | easy | medium | scalar |
| x, y component | fetch | medium | scalar |
| length, angle | medium | fetch | scalar |
| normalize | medium | fetch | vector |

This suggests:

1) Vector addition and subtraction will convert to Cartesian if necessary and produce a Cartesian result.

2) The result of negate and scale will have the same valid components as the operand.

3) Dot product will use the operands as is unless one is polar and the other Cartesian. In that case the polar operand will end up having both representations valid, and the Cartesian formula will be used.

4) x, y, length, and angle will be fetched if valid, otherwise computed and stored for future use.

5) Normalizing a polar vector will simply extract the angle and set the length to 1. Normalizing a Cartesian will extract the length as in #4.

Matrices

This implementation of a matrix class contains the following implemention features:

Parameterization of the class by storage type and size. Only square matrices are implemented, reducing runtime error checking requirements.

Use of an array ccVectors to contain the matrix data.

The LU decomposition method is used for matrix inversion. This method has the advantage that once done, inversion, or the solution for a vector requires only N**2 operations. Including the overhead for the LU decomposition, the solution for one set of equations is as efficient as GaussJordan elimination. LU decomposition can be shown to be equivalent to Gaussian elimination. The theory and computational costs is well covered in "C Numerical Recipes" and Strang "Linear Algebra and Applications".

Quantities with a high computational cost are carried with with the class, but become invalid if the matrix data changes.

A note to readers of the code: there is a private "ccVector operator (const int) const"

used to construct column vectors from the matrix elements and is used in many arithmetic operations. Do not confuse this with a function call.

There are a number of issues which subsequent implementations of ccMatrix must address:

PseudoInverse. An approach I favor is to have an object which will compute the statistics for constructing a coordinate transform matrix. This object may be used as a ccMatrix constructor argument.

There are many operators and functions available for this class. A summary follows.

define T double define D 3

Constructors: default, copy, construction by a pointer to T or ccVector<T,D>. Note that in the latter two cases, there is an unsafe condition because the pointers are not guaranteed to be initialized, or to point to properly allocated and initialized memory. ccMatrix will not write through these pointers though.

T t;
ccVector<T,D> vector u,v,w;
ccMatrix<T,D> matrix M,N,X;
Binary operators; arithmetic and assignment:
M=N; M+=N; M-=N; M/=N; M*=N;
M+N; M-N; M/N; M*N;
M*t; M/t; M*=t; M/=t;
t*M; t/M;
v*M; v/M; v*=M; v/=M;
M*v;
Negation:
-M;
Logical:
M==N; M!=N;
Printing:
cout <<M;
M.print ( ... );
M.dump ( ... );
Member functions:
N=M.inv ();
N=M.adj ();
N=M.transpose ();
t=M.det ();
t=M.trace ();
t=M.cofactor (. . . );
Element & value access:
M.element (i,j)=t;
t=M.value (i,j);
Solving a system of equations M*X=N for X:
X.solve (M,N);
Solving u*M—v; for u:
u=v*M.inv() or v/M;
Solving M*u=v; for u, we have two techniques:
u=M.inv()*v;
u=v/M.transpose();
Three template signals are defined for ccMatrix,
ccMatrixSignal<T,D>::all is the parent for two children
ccMatrixSignal<T,D>::singular (thrown during an attempt to invert a singular matrix)
ccMatrixSignal<T,D>::internal (thrown if internal consistency checks fail)
ccMatrixSignal<T,D>::elementAccess (thrown if an element access function is called with invalid indices).

Math

Interface

Coordinate transformation enables information stored in one coordinate system to be used in another coordinate system. Arbitrary coordinate transformations can be performed, including non-linear and custom transforms.

All coordinate transforms share things in common:

A method to convert coordinates (x,y vector) from system A to B. (a forward transformation)

A method to convert coordinates from system B to system A. (a backwards transformation)

A method to compute the Jacobian of the transformation. The Jacobian approximates the transform as linear about its argument.

For simple transformations (such as linear transforms), the conversion routines and Jacobian computations are exact. In many cases these routines compute approximations around the desired point.

Inverse transforms are also desireable to obtain the direct transformation of B→A when the A→B transform is known.

The identity transform is the most basic type of transform. It maps the input coordinates directly to the output coordinates.

Transformations can be strung together such that the output coordinates from one transform become the input to another. If transforms T1 and T2 exist, T3 can be expressed as:

$$T3=T1*T2$$

to represent that T3 is the equivalent transformation as running T1 and T2 sequentially on the coordinates, This nesting can be arbitrarily deep allowing complex transformations to be expressed as a product of basic types.

A linear transform is a special type of transform. The output coordinates are computed by the formula:

$$F(x')=MF(x)+V$$

where:

F(x') is the output vector

F(x) is the input vector (x,y pair)

M is a 2×2 matrix containing scale, aspect ratio, rotation and skew information

V is the offset vector

See the documentation for the class cc2Matrix for more information on calculating the M matrix. The product of an arbitrary number of linear transforms is a linear transform. The inverse and jacobian of a linear transform is a simple closed-form expression.

Example (also see the unit test file xformtest.C)

Assume a job is trained with the part aligned with the axis of the camera. However, at runtime the part is slightly rotated. A linear transformation can be set up to convert coordinates from the training coordinates into the current coordinates.

See cc2Matrix and cc2Vector on how to construct these objects */float angle; /* part rotation in degrees */cc2Matrix transform(1.0, 1.0, ccDegree::zero, ccDegree::one * angle); ccLinXform correction(transform, cc2Vector(0,0));

Convert the coordinates (100,100) from training coords. to current */cc2Vector newpoint=correction→fwd(cc2Vector(100,100));

Implementation

Handles

Handles are used in the design for numerous reasons. A single handle class can point to any number of rep classes that perform different kinds of transformation. This makes it easy to express what operations are desired without worrying about conversions or casting. For example, the expression:

T1=T2*T3*T4 creates a new transform which is the product of three other (and arbitrary) transforms. As long as T1 is defined as the base handle class, the expression will work as desired.

Handles also allow the duplication of transform objects without the need to copy the data. See the documentation on handles for more information.

Base Rep Class the base class is called cc_CoordXform. The underbar denotes it is a rep class. You cannot make an instance of this class becomes its virtual. All derived classed must supply definitions for:

cc2Vector fwd (const cc2Vector&)
      const Forward transformation cc2Vector back (const cc2Vector&) const
      Backward transformation cc2Matrix jacob (const cc2Vector&) const
      Jacobian computation Two functions can be overridden if needed:

ccCoordXform inv () const
      Invert transform ccCoordXform compose (const ccCoordXform&)
      Product of 2 transforms Before I explain how the base class version of inv() and compose() work, I'll show you the heirarchy of the class:

Hierarchy

Handle Class:

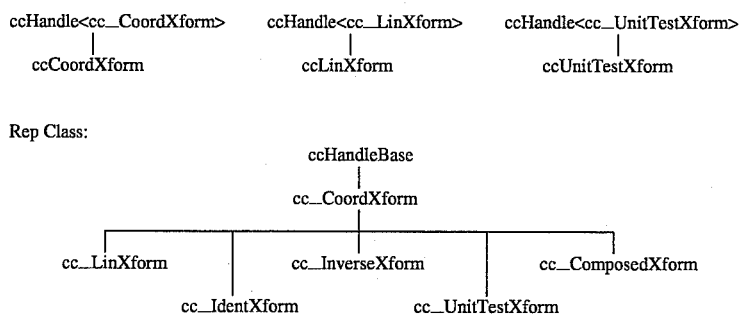

The user of the code only sees the handle classes. ccUnitTestXform only exists to perform unit testing and should be ignored for all other purposes. ccUnitTestXform does demonstrates how to write a custom transform (see xform.{H,C}).

A ccCoordXform can be thought of as the base handle class. ccLinXform does not derive from ccCoordXform but routines exist to convert between the two forms. A ccCoordXform can be constructed with a cc_CoordXform as argument. Although you can't make one of these it's the base class for the rest of the transform types. Therefore, any transform can be converted to a ccCoordXform.

Conversion from a ccCoordXform to any other type is possible because of conversion macros. When used you are guaranteed of getting an object of the desired type. However the new object may be empty if the original object could not be converted. See the macros cmBaseHandleDef and cmBaseHandleDcl (in handleBase.H).

ccUnitTestXform t1(v1); //v is a vector to initialize object
   ccCoordXform t2=t1; //Ok
   ccLinXform t3=t1; //Compile time error
   ccLinXform t4=t2; //Uninitialized handle created
   ccUnitTestXform t5=t2; //Ok Object t1 is defined as a ccUnitTestXform. The conversion to ccCoordXform (t2) is simply a matter of incrementing the reference count of the underlying cc_UnitTestXform. The line, "ccLinXform t3=t1" will cause a compile time error because direct conversion between ccLinXform and ccUnitTestXform is not allowed. The only conversions which are allowed are between derived classes. The line, "ccLinXform t4=t2" will allocate an uninitialized handle since it's not possible to convert the ccUnitTestXform to a ccLinXform. No compile time error is generated because the conversion is from a ccCoordXform to a ccLinXform which is valid. The last operation is the same as saying, "ccUnitTestXform t5=t1."

Two interesting classes are cc_IdentXform and cc_ComposedXform. The only way that these occur is if the functions compose() and inv() are not overridden in the base class cc_CoordXform. Let's look at inv():

ccUnitTestXform t1(v); /,/v is a vector to initialize object
   ccCoordXform t2=t12→inv();

The first line creates a ccUnitTestXform object called t1 (and also a cc_UnitTestXform is allocated). The "→" operator calls the inv() function of cc_UnitTestXform (see handle.H). A cc_InverseXform object is allocated and keeps a pointer to the original cc_UnitTestXform. A new ccCoordXform is returned which points to the cc_InverseXform. The description of cc_CoordXform::inv() in xform. C will provide you with more of the details. So what really has happened? Not much. A new ccCoordxform is constructed which points to an allocated cc_InverseXform. Examining the member functions of cc_InverseXform will show what's going on. The fwd() function calls the back() function of the ccCoordXform passed to it earlier. Ditto for the back() function. The class keeps track of the bookkeeping for you.

cc_ComposedXform works in the same way. The compose() member function in cc_CoordXform (which is called by the * operator from ccCoordXform) combines two ccCoordXform's together into a new one. No real work is performed until a transformation is requested. For example:

```
ccUnitTestXform t1(v1);
ccUnitTestXform t2(v2);
ccCoordXform t3 = t1 * t2;      // compose t1 and t2 together
cc2Vector v4 = t3->fwd(v3);
``` is exactly the same thing as writing;

```
ccUnitTestXform t1(v1);
ccUnitTestXform t2(v2);
cc2Vector v4 = t2->fwd(t1->fwd(v3));    // Confusing isn't it
```

The power of C++ and handles really shows through here.
What about cc_LinXform? cc_LinXform overrides all the default definitions in cc_CoordXform. For example:

```
ccLinXform t1(m1,v1);      // matrix m1, vector v1
ccLinXform t2(m2,v2);
ccLinXform t3 = t1 * t2;
``` does not make a cc_ComposedXform for t3. Instead, a new cc_LinXform is created with a matrix and vector that represents the combination of the two. Another form of composition involving linear transforms is:

```
ccLinXform t1(m1,v1);
ccUnitTestXform t2(v2);
ccCoordXform t3 = t1 * t2;    // Correct
ccLinXform   t4 = t1 * t2;    // Wrong!!
```

In this case a cc_ComposedXform is made since both items are not linear transforms. The relevant member functions called for composition are:

ccCoordXform ccLinXform::operator * (const ccCoordXform&) const {return (*this)→compose(c);}
  ccCoordXform cc_LinXform:: compose (const ccCoordXform&) const;

In the correct case, a ccCoordXform is created and its handle points to a cc_ComposedXform object. In "the second case the same thing happens but the object is converted to a ccLinXform. A ccLinXform can't point to a cc_ComposedXform so an uninitialized handle t4 is created. This is NOT a compile time error. The code will convert from one type to another if possible or return an uninitialized handle. If t4 is used in a later step the signal ccHandle<cc_LinXform>::uninitialized will be thrown.

cc_IdentXform implements the identity transform. The input coordinates are mapped directly to the output coordinates. cc_IdentXform is only used to create a single static object, cc_IdentXform::I. However, it's a bit more complicated than that. The user cannot access the cc_IdentXform::I directly. Instead, another static, ccCoordXform::I is setup to be the handle to cc_IdentXform::I. A private constructor in ccCoordXform exists solely to initialize ccCoordXform::I. As to be expected, the member functions of cc_IdentXform are trivial.

RepInvariant()

There are no coordinate transformations that hold redundant information. Therefore, the internal state of the classes cannot be measured by looking at anything in the transform classes. The repInvariant() function will call the appropriate repInvariant() functions of its base classes (as well as those of its data members). repInvariant() member functions are not necessary in all classes because they can conveniently use the base class version found in ccObjectInfo.

ccLinXform::repInvariant() can check the internal state of its matrix and vector by calling the repInvariant() function for cc2Vector and cc2Matrix.

Ordered Pairs

Overview

The pair class, ccPair, is a simple packaging of an (x,y) pair of parameterized numeric types into a single object. A ccPair object can be constructed with prespecified values for (x,y), or these can be left uninitialized and supplied later.

For simplicity, pairs do not derive from ccObjectInfo. As a result, no repInvariant() is derived from ccObjectInfo. This should be okay since most ccPair instances will be of C numeric types or of some class type which has it's own repInvariant(). In ccPair, which is a simple container class with a few operators, repInvariant() does nothing and returns *this and it's not virtual.

There are four predefined ccPair typdefs: csSPair, ccIPair, ccFPair and ccDPair. These correspond to short, int, float and double type pairs.

Pairs have no virtual functions.

ccPair doesn't allocate memory—the default destructor is used. If the template type for a particular instance of ccPair is an object which allocates memory, it is up to the template type to provide memory management and the destructor.

There is a conversion operator for pair to cc2Vector. Also, there is a constructor to create pair objects from cc2Vector objects. A ccPair object is used in place of a cc2Vector when one doesn't want the complexity and overhead of a cc2Vector and only needs the (x,y) cartesian coordinates.

Operations

The actual pair values can be accessed/set from member functions x() and y().

The +, −, += and −= operators will perform the expected math operations between two pairs. In the cases of + and −, a pair is returned. In the cases of += and −= a reference to the pair on the LHS of the expression is returned.

The *, /, *= and /= operators will perform the expected scalar operations between a pair and an object of the same numeric type as the pair. For example, multiplying or dividing a pair of type int by int i=2. In the cases of * and /, a pair is returned. In the cases of *= and /=, a reference to the pair on the LHS of the expression is returned.

The == and != operators will compare ccPair's of the same type.

There are min() and max() functions for comparing ccPair objects of the same type. They are predefined for ccSPair, ccIPair, ccFPair, ccDPair.

Notes

Since most ccPair objects will be from the numeric type, short, int, float and double, the corresponding typedefs are used. No manual instantiation is usually needed. Instances min() and max() functions on ccPair had to be provided for the four predefined types. This was needed since the generalized min() and max() template functions on ccPair could not be manually instantiated. Also, making them inline (to avoid instantiation) caused a known MRI bug with addressing to appear (as of 20 May 1992).

An overload of stream output, <<, has been provided as a template function. However, due to a cfront bug (bug #32), this does not currently compile. This will be fixed in pair.C and pair.H as soon as the cfront bug is fixed (as of 20 May 1992).

Screens

Introduction

Screen objects are displayable GUI-like entities for the VP display. These objects can be selected and dragged in a familiar manner. A fairly complete set of routines are available. Most member functions only operate on the object itself while a few require access to other objects via a list of screen objects maintained by ccScreen (more about this in the ccScreen section and in the comments of screenObj.H). The base class defines the default behavior for every operation and is overridden by a derived class when needed. There are many, many member functions. However, most are trivial so the class just looks complicated.

The Cognex library contains the notion of a graphics stack. Items on this list define not only what to draw on the screen but also in what order. See the documentation on the Advanced Graphics package and the file graphics.txt for more information. A single screen object can have multiple entries on the graphics stack.

When a screen object changes (size, location, color, . . . ) it must be redrawn with its new attributes. However, if many objects must be redrawn, the display may appear jerky while each object decides to update itself. A feature of this design is that changes to screen objects are not made immediately. Rather they save this information for a central routine to update all objects at the same time.

Handles can be associated with screen objects to allow them to be edited. The class ccScreenHandle provides additional information.

Q: Can multiple screen objects respond to a single event?

A: The concept of a screen group allows multiple screen objects to be related, Operations such as selecting or moving these objects can be made with only a single function call, see ccScreenGroup Q: What kind of buttons are supported?

A: ccButton is a combination of a ccPlaneFigure (typically a GenRect) and text. It's not pretty to look at but was very straight forward to implement.

ccIconButton is a combination of a ccIcon and text. The ccIcon is a filled in item that can be of any size (but is always rectangular).

A number of enhancements to the code are pending:

Use ccString for ccButton instead of a char*.

Fully implement repInvariant() (cfront issues compiler errors in some circumstances)

Implementation

The base class ccScreenObj defines default behavior for all operations. It is unlikely that anyone will actually make a ccScreenObj because routines such as draw (to display the object on the VP screen) are empty. Almost all member functions of ccScreenObj are virtual to allow overriding by derived classes. The ccScreenObj ctor is not protected to allow unit tests to directly test the base class.

Some member functions are referred to as compatibility routines because they were written to replace original ccScreenObj (before ccList was added) functions. Accessing the list usually involves moving the list pointer. Most functions must return this pointer to its original value because the calling routine may be using it.

The flags field contains useful information about the state of the object:

| | |
|---|---|
| selFlag | Indicates the object is selected. |
| visFlag | Indicates the object is visible. This object must also be on the screen |
| reDrawFlag | ccScreen's update function will redraw an object if this flag is set and the object is visible |
| rePosFlag | ccScreen's update function will move an object on the graphics stack (a stack splice) if this flag is set and the reDrawFlag is not set. |
| onScreenFlag | Indicates the object is on screen. Note that this used to be determined by seeing if the |

-continued

| | |
|---|---|
| | object had a reference to the graphics stack. However, because screen groups complicate things, the flag is separate. |
| SubObjFlag | A screen group consists of multiple screen objects it owns. This flag if set for all screen objects which are part of a screen group. |
| availFlag | The notion of a selected state is not enough to satisfy the requirements of the project. An item can be selected but not allowed to participate in a drag. For this reason, the availFlag is used to indicate objects which are allowed to take part in a drag. availFlag should never be on when selFlag is clear. |

Every ccScreenObj contains a reference to the ccScreen which owns it. It's through this feature that a ccScreenObj can traverse the list of screen objects itself to perform certain functions. A ccListPlace links the ccScreenObj to its entry on the list. The ccListPlace will be null when the object is not on the screen.

The class ccGStackMark is used by ccScreenObj to mark the top and bottom graphic stack entries used by the object. It's possible that these entries will be null if the object isn't visible.

Here's the hierarchy:

ccScreenObj is the base class all screen objects derive from. You will never make one of these objects directly.

ccScreenBack represents the fixed background of the screen. Only one of these is created (by ccScreen) and is fixed at the bottom of the list. You cannot hide or remove this object (or you'll get a ccScreenObj::backObjErr thrown). The isTouched() method always returns true to indicate that this object is always touched by the pointing device. Since this is always the last object on the list, there is always an object to send messages to.

ccScreenFigure adds the ability to have a ccPlaneFigure (or ccRegion) as a screen object. ccScreenFigure can be used directly to display and drag objects such as points, lines, ellipses . . . .

ccButton derives from ccScreenFigure. It's essentially a ccScreenFigure with two important changes. The first is that a button has a string that is displayed within its region (by the way, the normal region to use for a button is a ccGenRectHdl). Secondly, the click routines are customized so should the item be selected (lClick()), a predefined action routine is called. The phase1 demo uses this extensively so consult phase1vp.C for more information.

ccScreenIcon derives from ccScreenObj and associated a ccImage with text. The ccImage represents the bitmap to be displayed as the background. A separate ccImage describes what the bitmap looks like in its selected state. An action routine is executed when the icon is clicked. The main uses for ccScreenIcon is to derive ccIconButton and display tool palettes.

ccIconButton derives from ccScreenIcon and for most purposes supercedes ccButton. A ccButton cannot be displayed filled in while a ccIconButton can. When clicked, the button shows that it has been clicked in a manner similar to what Microsoft Windows does.

ccScreenMessage derives from ccScreenObj and provides simple, 1 line messaging displays. The message can be changed or removed. The background color can be specified and the alignment of the message around the specified point (for instance, centered) can be specified. Each ccScreen has an instance of ccScreenMessage for global use. The messages are displayed at the upper left hand corner of the monitor. The member function ccScreen::message() gets you to the ccScreenMessage.

A ccScreenGroup is a collection (a list) of ccScreenObj which is itself a ccScreenObj. The behavior of a ccScreenGroup is to relay any message it receives to its list of ccScreenObj. A few additional functions are added to simplify adding and removing items from the list. Members of a ccScreenGroup do not directly exist on the list of screen objects. Instead, the ccScreenGroup is part of the list and sends the appropriate messages to its member objects. Some care is needed when dealing with a screen group because the subobjects cannot handle some member functions directly (those that assume that its on the screen list directly).

ccScreenHandleGroup derives from ccScreenGroup and associates a screen object with its editing handles. Handles can be one or more of: rotation, rounding and scaling. A selected screen object is converted into a ccScreenHandleGroup when the object is selected. The bottom item in the group is the screen object with its handles above.

ccScreenHandle derives from ccScreenObj and is the base class for handles. All handles know which group they belong to and know how to access the original screen object (it's at the bottom of the screen group). Handles can be public or private. A private handle is restricted to the group in which it belongs. A public handle will effect all selected screen objects, not just what belongs to its own group.

ccScreenSizeHandle derives from ccScreenHandle and provides the logic for sizing one or more selected objects. Sizing is around the anchor point of the selected object. The dragMap() produced by this class is used to drag all currently selected items. Sizing can be public or private.

ccScreenRotateHandle derives from ccScreenHandle and provides rotation around the center of the selected object. Rotation can be public or private.

ccScreenRoundHandle derives from ccScreenHandle and provides the ability to change the rounding of an object. This currently only applies to a ccGenRect and ccGenAnnulus. The dragMap() scheme is used but the map returned is always the identity transform. The dragMap() routine must modify the rounding information directly since this is not a coordinate transformation.

ccScreenGenRect derives from ccScreenObj and handles the special requirements of training and editing general rectangles. A ccScreenFigure cannot be used instead because this object specifically trains a general rectangle. You can do similar operations with a ccScreenFigure but it's limited.

ccScreenAnnulus derives from ccScreenObj and handles the requirements of training and editing a general annulus. A ccScreenFigure can represent a general annulus but knows nothing about training the center portion of the annulus. ccScreenAnnulus allows the inner general rectangle to be scaled and rounded independently of the outside portion of the region.

ccScreenMenu derives from ccScreenGroup. It assembles a number of ccButtons together into a menu.

You'll see a number of simple functions that are not inlined (For example, markTop() and markBot()). This was done to prevent a MRI bug from producing the wrong code.

ccScreenGroup

For most member functions, ccScreenGroup issues the same member functions to all the objects in its list. A couple of macros are used to greatly simplify things. In most cases, the state of the ccScreenGroup object is also modified. An example of a simple member function is select(). ccScreenGroup::select() issues a select() call to all members of the list. The member function isGroup() returns true.

Members of a screen group cannot execute certain member functions because the functions assume that the object is on the main list. For example, the function above() tries to move an object higher in the list. This will cause a ccList exception to be thrown since the item isn't on the list in the first place.

Two member functions are added to ccScreenGroup:
ccScreenObj* addSubObject (ccScreenObj* so);

The specified screen object is added to the front of the list. The screen object should be allocated from the heap (ie: not a local) because members must not go out of scope until the list screen group is no longer needed.
void removeSubObjects ();

All the objects in the list are removed. delete is called on each object to free up its memory.

There are a number of exceptions how ccScreenGroup handles certain member functions:
int draggable() const;

The group is draggable only if at least one member is draggable
int isTouched (const ccFPair& p);

The group is touched is one member reports it is touched.
void drag (const ccCoordXform& c);

Only those members which are available (availFlag set) are dragged.
ccCoordXformm dragMap (const cc2Vector& v) const;

The owner of the drag (indicated by dragOwner) is called to determine the drag. If noone owns the drag, the screen group returns the identity transform.
void dragStart (const ccFPair& p);

The group will only call dragStart() of the first member that indicates it's touched.
void dragStop (const ccFPair& p);

The group will only call dragStop() of the owner of the drag.
void click (const ccFPair& p);

All members which are touched receive the click().
void dblClick (const ccFPair& p);

All members which are touched receive the click().
Screen Handles ccScreenHandle gives shapes the ability to be edited on the screen. When an item is selected, the shape is converted into a ccScreenHandleGroup. This group usually consists of the original object (at the bottom of the list) with handle objects located above. The handles which are displayed are determined from the object itself (There's a handleFlags variable which specifies the handles to use). These handles can be clicked and dragged to manipulate the object. In many cases, all selected items are affected by the drag. When the item is deselected, the ccScreenHandleGroup is destroyed and the original object is returned to the list.

A public handle is one that will cause all selected items to be changed. A private handle only causes the screen object in its own group to change.

If you look at the code you may seem some excess baggage hanging around. I chose not to remove some unneeded functionality right away until it's safe to do so.

The handles are derived from ccScreenHandle. Their behavior is:

ccScreenSizeHandle

Represented by a square box at the upper right corner of the rectangle that encloses the object. Clicking and dragging this handle causes the size to be scaled around the anchor point of the object (the lower left corner of the enclosed rect).

ccScreenRotateHandle

Represented by a circle at the center of the enclosed rectangle. Clicking and dragging this handle causes the object to rotate around its center.

ccScreenRoundHandle

Represented by an X somewhere between the center of the object and the lower right hand corner of the enclosed feet. Only certain objects can use this handle (general rectangles and general annuluses). By dragging the point toward the lower right corner, the objects gets less round (ie: more like a rectangle). Dragging the point toward the center of the object increases the amount of rounding.

ccScreenAnchorHandle

Represented by a cross at the lower left corner of the ennclosed rectangle. Sizing occurs around this point (ie: the anchor point will not move when sized). This used to be a separate screen handle but since it's fixed, the need For it goes away. Note: Currently the ccScreenAnchorHandle class still exists.

ccScreenGenRect and ccScreenAnnulus ccScreenFigure allows any ccRegion to be manipulated. The use of handles even allows them to be edited. However, special classes were developed to allow complete editing of the most common shapes.

ccScreenGenRect allows a general rectangle to be edited. squares, rectangles, circles and ellipses are special cases. It is similar to what ccScreenFigure does but is specific to general rectangles. For instance, a ccScreenFigure can't do much better than arrange the handles at the corner of the enclosed rectangle. If the object is rotated, the handles can sometimes be quite a distance from the actual object. However, since a ccScreenGenRect knows what type of shape it is, the handles are still displayed in their expected position, even when rotated.

ccScreenAnnulus allows a general annulus to be edited. When it is selected, two ccScreenGenRect are created, one which represents the inner region and on the outer region of the annulus. The inner region handles are private (ie: only pertain to the inner genrect). The outer region is public (ie: causes all selected objects, including the inner genrect to be changed). The genrect which represents the inner region is placed above the outer one on the screen object list. The original screen annulus is removed from the list but not deleted. When the objects are deselected, the original genannlus is redisplayed.

The debug function screendebug() displays the list of screen objects. A ccScreenAnnulus unselected looks like:

| this | above | below | svss<br>eitc<br>lskr | color | name |
|---|---|---|---|---|---|
| 0x21686c | 0x0 | 0x215186 | 0111 | 12 | 10 ccScreenAnnulus |
| ... unimportant ... | | | | | |
| 0x12ce34 | 0x12d0f2 | | 0x0 0111 | 12 | 10 ccScreenBack |

When selected, the list looks like:

| this | above | below | svss<br>eitc<br>lskr | color | name |
|---|---|---|---|---|---|
| 0x2178ba | 0x0 | 0x21694a | 1111 | 13 | 6 ccScreenHandleGroup (inner region) |
| 0x217966 | | | 1111 | 33 | 6 ccScreenSizeHandle |
| 0x217910 | | | 1111 | 33 | 6 ccScreenRoundHandle |
| 0x216900 | | | 1111 | 33 | 6 ccScreenGenRect |
| 0x21694a | 0x2178ba | 0x215186 | 1111 | 13 | 6 ccScreenHandleGroup (outer region) |
| 0x21785e | | | 1111 | 33 | 6 ccScreenSize Handle |
| 0x217808 | | | 1111 | 33 | 6 ccScreenRoundHandle |
| 0x216a70 | | | 1111 | 33 | 6 ccScreenRotateHandle |
| 0x216a1a | | | 1111 | 33 | 6 ccScreenAnchorHandle |
| 0x2168b6 | | | 1111 | 33 | 6 ccScreenGenRect |
| ... unimportant ... | | | | | |
| 0x12ce34 | 0x12d0f2 | | 0x0 0111 | 12 10 | ccScreenBack |

Important Functions for All Screen Objects
void front(void);
void back(void);

The easiest way to make a ccScreenObj part of the list is to issue the front() or back() command. front() will move the item to the top of the list. Both of these functions call insertAbove() to do the actual work.

ccScreenObj* above(void);
ccScreenObj* below(void);

Returns the object directly above or below this screen object. There are a number of subtle points to remember. above() and below() return NULL if the list is already at the top or bottom. The routines also try to optimize the process by seeing if the list pointer points to the current object. This saves finding the current object on the list (a potentially lengthy process). The member functions aboveView() and belowView() work exactly the same except the list pointer is returned back to its original position when done.

void hide(void);
void show(void);

Once an item is on the list, the show() command will cause the object to be displayed (once the update() function of ccScreen is executed). Likewise, hide() removes the item from the screen.

To create a button and have it displayed:

ccButton *but= new ccButton (screen, ccGenRectHdl (ccGenRect (ccFPair(50,40), ccFPair(20,10), ccRadian::zero, ccFPair(5,5))), "label", buttonaction);
but→front();
... update() ....

Modifying screen objects should be done when they are not on the graphics stack. For instance, the function select() contains:

hide (); //Remove graphic stack items and make invisible
    front(); //Move object to the top of the stack and redraw graphics
    show (); //Make the object visible and redraw it.

In reality, nothing happens to the display until update() is called because the changes to an object are accumulated until someone calls update().
void removeFromList(void);

It's desireable to have a screen object delete itself from a list. This function accesses the list maintained by ccScreen.
void select (void);
void deselect (void);

The color of the object is changed (if needed) to the colors norColor or selColor. The object is also moved to the top of the list.
void draw (ccGcw);

Draw the screen object on the screen using the graphics stack. Override the default in ccScreenObj.
void drag (ccCoordXform&);

Apply the specified coordinate transformation to the screen object. Override the default in ccScreenObj,
ccScreenObj* showHandles ();
ccScreenObj* hideHandles (ccScreenGroup* sg);
ccPoint sizeHandlePoint () const;
ccPoint roundHandlePoint () const;
ccPoint rotateHandlePoint () const;
ccPoint round (float) {return ccPoint(0,0);}
void dragStart (const ccFPair&);
void dragStop (const ccFPair&);
void click (const ccFPair&);
void dblClick (const ccFPair&);

Screen Documentation
    The following files are discussed:
    $localDEFS/screenObj.H
    $localSRC/screen.C
    Last updated: Nov. 3, 1992
    Philip Romanik Most access to the list is made by member functions of ccScreenObj. The update() function scans the list of screen objects (as well as the graphics stack) looking for update work to perform.

A number of enhancements to the code are pending:
    Upgrade performance of update() function (use lists more efficiently).

Implementation

The list of screen objects associated with ccScreen is maintained as a list of ccScreenObj*. Pointers were chosen because many functions must modify the contents of a screen object (something that you can't do easily if the object itself is part of the list). Screen objects could have been turned into handled objects but the overhead seemed to be getting a little ridiculous (plus I felt like doing it the other way).

The last item on the list is always an instance of ccScreenBack. This item gets initialized by the ccScreen ctor. It's impossible to remove using the functions provided by ccScreenObj and ccScreenBack. ccScreenBack is always visible and on screen. update() and other functions frequently use this fact to simplify the looping through the list. The ccScreen ctor is also important in that the fixed bottom element of the graphics stack is associated with the background screen object.

The most important member function is update(). The method by which it works provides insight into the graphics stack as well as the careful manipulation of flags. Member functions of ccScreenObj modify the flags and position of the screen objects on the list. No changes are seen on the screen until update() is called. Since every screen object points to the elements on the graphics stack it controls, update() removes frames from the graphics stack as well as changes the color. Screen objects are moved around on the list as required, typically in response to a select() or front() function which moves a screen object to the top of the list. Items near the top of the graphics stack appear to be drawn on top of items near the bottom of the list. update() also redraws objects in response to the show() function.

The update() function required numerous changes to support screen groups. Update() is split into a number of functions, some of which are recursively called to handle screen groups.

A screen can be created by the following code fragment:

```
cip_buffer *mywindow = cip_window(caq_gplane, NULL, 0, 0, caq_gplane->width,
                                  caq_gplane->height);
ccCogTB tb = 0;
ccRawImage rawImg(mywindow);
ccImage img(rawImg);
ccScreen screen(img, screenCursor, tb, 300, 25000);
                     ↑
           (function to display cursor)
```

Introduction ccScreen manages most or all screen objects. There can be more than one instance of a screen on the VP since the display can be broken into multiple areas. There are two important things that ccScreen takes care of. First, a graphics stack is maintained for real-time display. Second, a list of screen objects is kept that belongs to ccScreen. Given a reference to a ccScreen it is possible to extract such information as:

All the ccScreenObj that belong to this ccScreen
    The display (and hence image) associated with this screen

Strings

Overview

Strings are immutable ordered collections of chars that can be searched, compared, concatenated, and built up in a variety of methods. They can also be inserted and extracted from iostreams. In particular, they are safe from memory management errors so common to using old C style strings.

The class ccString is a handle type that provides a rich set of functionality in member functions and operators. Most operators are defined to minimize temporary constructions from literals (which are unchangeably 'const char*'). Many functions are provided in inline form.

Operations

The operations with a description of return values and exceptional conditions can be found in the header file itself. Note that equality compares on empty strings now, z.B.
ccString foo="", bar ="", assert (bar==foo);

Notes

Many of the inline functions are repackaging of other functions. For example, most of the comparators use calls to other comparators. A fat interface to these functions was chosen to support the most natural possible interface to this type.

At the lowest level, many functions are implemented using the ISO C string.h package. The implemenation file has the definitions of the abstraction function and the rep invariant.

The class has way more operators defined than I usually like, but it does seem natural to be able to use strings in this way. One possibly controversial choice is the use of operator + for concatenation. I had originaly implemented operator |, but later found this to cryptic (too much Visual Basic, I guess).

A choice crucial to the implementaion and design is the class immutability. This is key factor in understanding the idiomatic usages. Consider the concatenate operation:

ccString text="blue waves of surf";
    ccString fo=text->concat(" envelope the");
    cout<<text<<endl<<fo<<endl;

produces:

blue waves of surf
    blue waves of surf envelope the and not:

blue waves of surf envelope the
    blue waves of surf envelope the

The use of the operator syntax for concatenation makes this more clear:

ccString fo=text +" envelope the";

Block storage is used for cc_String, but the raw chars storage is on the heap. Strings could be heavily optimized by using a special allocator for the chars storage.

Note that no implicit conversion to const char * (or char *) is provided. This certainly would be convenient in some cases, but I think it is risky. 1. Not all strings have string storage that correspond to the equivalent char* representation (empty strings, in particular) 2. The life time of temporaries question is yet unresolved, and varies widely over compilers.

This paragraph used to say: "In any event, the explicit operation copy_to_buf (note the C style naming) is provided for this circumstance." However, to use this function, allocate a temp buffer, unwind protect it, etc. every time you needed to call a C string function was way too error prone. To provide for this, I've added an explicit conversion to const char* "cStr". The lifetime over which this rep is valid is not guaranteed to be much of anything, but it should be unsurprising for the most part.

However, implicit conversions to int, long, and double based on the ISO C standard atoi, atol, and atod functions have been added.

The operations and overall usage was loosely based on the CLU string package from _Abstraction and Specification of Program Development_; Liskov and Guttag, MIT Press, 1988.

Future Directions

Implement a local allocator for chars storage.

Integrate strings into the iostream package to facilitate usage. The classes fstreams, etc. could tremendously benefit here.

Add functionality from the X3J16 string proposal, and the ISO string.h package.

:::cStr:::

Tue Mar. 30 14:42:24 1993 Samuel Druker (samuel@royal_east)

There has been a change to the way ccString should be used when interfacing to old C functions. C++ functions, of course, should be written to strings instead of char* in all cases*.

The old method involved copy_to_buf:

startLog (ccString filename)

```
{
    char * c = 0;
    c = new char [filename->len( ) +1];
    // Don't forget code to unwind protect this memory.
    filename->copy_to_buf (c, filesname->len( ) +1];
    FILE* fp = fopen (c, "a+");
    // ..
    delete c;
```

The new method is to use cStr:

```
startLog (ccString filename)
{
    FILE* fp = fopen (filename->cStr( ), "a+");
```

::Caveats::

For functions that need write access to a buffer, you will need to use copy_to_buf, as you aren't allowed to write to the C string you get from cStr. To enforce this, its return type is const char*.

Be cautious about using this on temporaries of type ccString. If your temporary goes out of scope, then cStr is a wild pointer. You can lock down your temporary by naming it . . .

ccString  name—big_struct.screenObjPtr→listPlace→
        nameString; fopen (name→cStr, "r");

Note that you might get a wild pointer by doing this:

fopen          (big_struct.screenObjPtr→listPlace→
        nameString→cStr (), "r");

because there's no guarantee that the temporary will still be existent after the call to cStr but before the call to fopen.

This is also dangerous:

```
startLog (ccString filename)
{
    const char* c = filename->cStr( );
    // .. code ...
    fopen (c, "a+");
```

If filename has been assigned through, for example, and no other references are using the string rep that it used to point to, the value of c is a wild pointer.

Avoid binding the return value of cStr. Keep the ccString, thus ensuring that it's call to cStr will produce a valid result.

Never assume that the return value of cStr *is* normally part of the internal rep, or that it will be unique among ccStrings.

This change was made, mostly because the code to use copy_to_buf in the simple cases presented above was even more error prone than worring about the lifetime of temporaries or the internal pointer binding above.

The only possible exception is if you only expect to get C string compile time literals, when const char* ought to be used.

Tables ccTable<K,E>

Stores a table of elements, type K, by key, type E. A hashing function and the table size, specified in the constructor, are used to store the <key,element> pairs in buckets based on the unsigned hash value gotten from the key.

Requirements:

User must supply a hashing function to ccTable\'s ctor. This hashing function takes objects of type K and returns an unsigned hash key.

Elements can be anything, but must be printable with iostreams.H for dump() and print() members and have default ctors.

Keys can be anything that meet three requirements. They must be printable with ostream& operator<<(ostream&, const K&), int operator==(const K&, const K&) (or equivalents) must work on it for comparing one key K with another, and they must have a default ctor. Naturally the key type must give the user enough support to write a sensible hashing function.

ccTableIterator

Iterator for tables. Provides an increment operator to get the next reference and a comparison to integer zero to see if the iteration is complete. Order of enumeration is arbitrary and whether or not an item that has been added during iteration appears is arbitrary. The increment operators and the conversion to int return zero if there are no more elements, non-zero otherwise. Initialization leaves the iterator at the first entry in the table.

SUMMARY

A further understanding of the prefered, illustrated embodiment may be attained by reference to the software listings provided in the appendix filed herewith, which can be found in the application file at the U.S. Patent and Trademark Office.

In accordance with the above description, the invention attains the objects set forth. It is further intended that all matter and the description and drawings be interpreted as illustrative and not in a limiting sense. That is, while various embodiments of the invention have been described in detail, other alterations which will be apparent to those skilled in the art are intended to be embraced within the spirit and scope of the invention.

In view of the foregoing, what is claimed is:

1. A digital processing system for interactively generating a computer program, said system comprising A. program storage means for storing a program signal representative of a syntactically correct computer program being generated, B. display means, coupled to said program storage means, for displaying at least a portion of said computer program being generated, C. positioning means coupled to said display means for demarking a location of interest within said computer program being generated, and for generating a position signal representative of that location, D. menu means, coupled to said program storage means and to said positioning means, for responding to said position signal and said program signal for graphically displaying one or more syntactically correct modifications of said computer program being generated at said location of interest, said menu means including selection means for inputting an operator selection corresponding to at least one of said syntactically correct modifications, and for generating a selection signal representative of that operator selection, and E. update means, coupled to said selection means, said program storage means, and said positioning means, for responding to said selection signal, said position signal and said program signal, for generating and storing in said program storage means an updated program signal representative of said computer program being generated as modified in accord with said at least one syntactically correct modification corresponding to said operator selection.

2. A system according to claim 1, wherein said menu means includes means for graphically displaying said one or more syntactically correct modifications to include one or more programming statements for insertion at said location of interest in said computer program being generated.

3. A system according to claim 2, wherein said menu means includes means for selecting said programming statements for display to include one or more statements for machine vision analysis of an image.

4. A system according to claim 1, wherein

A. said program storage means includes means for storing said program signal as representative of a syntactically correct intermediate form of said computer program being generated, and B. said update means includes intermediate code generator means for generating said program signal as representative of a syntactically correct intermediate form of said computer program being generated.

5. A system according to claim 4, wherein said intermediate code generator includes means for generating said program signal as a syntax tree representative of a syntactically correct intermediate form of said computer program being generated.

6. A system according to any of claims 4 or 5, wherein said display means includes A. conversion means for converting said program signal from said intermediate form to a format of a selected computer programming language, and B. means for displaying sad computer program being generated in the format of said selected computer programming language.

7. A system according to any of claims 4 or 5, wherein said menu means includes means for graphically displaying said one or more syntactically correct modifications to include one or more programming statements in the format of a selected computer programming language for insertion at said location of interest in said computer program being generated.

8. A system according to claim 1, wherein

A. said menu means includes means graphically displaying said one or more syntactically correct modifications to include one or more statements for invocation of a machine vision analysis tool, said machine vision analysis tool requiring input parameters, B. imaging means for generating a candidate of an image upon which said machine vision analysis tool is to operate, C. graphical input means, coupled to said selection means and to said imaging means, for selectively displaying in connection with said candidate image a :manipulable graphical icon, said graphical input means including means for responding to operator manipulation of that icon for generating values for one or more of said input parameters, and D. said update means includes means for generating and storing in said program storage means an updated program signal representative of said computer program being generated as modified to include one or more syntactically correct programming statements for invoking said selected machine vision analysis tool and for supplying thereto said values for said one or more input parameters.

9. A system according to claim 8, wherein said graphical input means includes means for displaying as said manipulable graphical icon at least one of a cross-hair and a marquee.

10. A system according to claim 8, further comprising textual input means, coupled to said selection means and to said update means, for selectively displaying a textual input icon requesting one or more of said input parameters, said textual input means including means for responding to operator input to said textual input icon for generating values for one or more of said input parameters.

11. A system according to claim 8, wherein said textual input means includes means for displaying said textual input icon as a dialog box.

12. A system according to any of claims 9 or 10 further comprising run-time means for executing said program to invoke said selected machine vision analysis tool using said values for said one or more input parameters and, thereby, analyzing an image of an object.

13. A digital processing system for interactively generating a computer program for use in conjunction with machine vision analysis of an image, said system comprising A. selection means for selecting, for inclusion in a computer program being created, a machine vision analysis tool to be invoked by that program, said machine vision analysis tool requiring input parameters, B. imaging means for generating a candidate of an image upon which said machine vision analysis tool is to operate, C. graphical input means, coupled to said selection means and to said imaging means, for selectively displaying in connection with said candidate image a manipulable graphical icon,
said graphical input means including means for responding to operator manipulation of that icon for generating values for one or more of said input parameters, and D. update means, coupled to said selection means and to said graphical input means, for generating a program signal representative of at least a portion of said computer program being generated, said portion including one or more syntactically correct programming statements for invoking said selected machine vision analysis tool and for supplying thereto said values for said one or more input parameters.

14. A digital processing system according to claim 13, wherein said graphical input means includes means for displaying as said manipulable graphical icon at least one of a cross-hair and a marquee.

15. A digital processing system according to claim 13, further comprising textual input means, coupled to said selection means and to said update means, for selectively displaying a textual input icon requesting one or more of said input parameters, said textual input means including means for responding to operator input to said textual input icon for generating values for one or more of said input parameters.

16. A digital processing system according to claim 13, wherein said textual input means includes means for displaying said textual input icon as a dialog box.

17. A digital processing system according to any of claims 14 or 15 further comprising runtime means for executing said program to invoke said selected machine vision analysis tool using said values for said one or more input parameters and, thereby, analyzing an image of an object.

18. A method for automated generation of a computer program, said method comprising A. a program storage step for storing a program signal representative of a syntactically correct computer program being generated, B. a display step for displaying at least a portion of said computer program being generated, C. a positioning step for demarking a location of interest within said computer program being generated, and for generating a position signal representative of that location, D. a menu step for responding to said position signal and said program signal for graphically displaying one or more syntactically correct modifications of said computer program being generated at said location of interest, said menu step including
an input step for inputting an operator selection corresponding to at least one of said syntactically correct modifications, and for generating a selection signal representative of that operator selection, and E. an update step for responding to said selection signal, said position signal and said program signal, for generating and storing in said program storage step an updated program signal representative of said computer program being generated as modified in accord with said at least one syntactically correct modification corresponding to said operator selection.

19. A method according to claim 18, wherein said menu step includes the step of graphically displaying said one or more syntactically correct modifications to include one or more programming statements for insertion at said location of interest in said computer program being generated.

20. A method according to claim 19, wherein said menu step includes the step of selecting said programming statements for display to include one or more statements for machine vision analysis of an image.

21. A method according to claim 18, wherein

A. said program storage step includes the step of storing said program signal as representative of a syntactically correct intermediate form of said computer program being generated, and B. said update step includes an intermediate code generator step for generating said program signal as representative of a syntactically correct intermediate form of said computer program being generated.

22. A method according to claim 21, wherein said intermediate code generator step includes the step of generating said program signal as a syntax tree representative of a syntactically correct intermediate form of said computer program being generated.

23. A method according to any of claims 21 or 22, wherein said display step includes A. a conversion step for converting said program signal from said intermediate form to a format of a selected computer programming language, and B. a step for displaying said computer program being generated in the format of said selected computer programming language.

24. A method according to any of claims 21 or 22, wherein said menu step includes the step of graphically displaying said one or more syntactically correct modifications to include one or more programming statements in the format of a selected computer programming language for insertion at said location of interest in said computer program being generated.

25. A method according to claim 18, wherein

A. said menu step includes the step of graphically displaying said one or more syntactically correct modifications to include one or more statements for invocation of a machine vision analysis tool, said machine vision analysis tool requiring input parameters, B. said update step includes the step of generating and storing in said program storage step an updated program signal representative of said computer program being generated as modified to include one or more syntactically correct programming statements for invoking said selected machine vision analysis tool and for supplying thereto said values for said one or more input parameters, said method further comprising C. an imaging step for generating an image upon which said machine vision analysis tool is to operate, D. a graphical input step for selectively displaying in connection with said image a manipulable graphical icon, said graphical input step including the step of responding to operator manipulation of that icon for generating values for one or more of said input parameters.

26. A method according to claim 25, wherein said graphical input step includes the step of displaying as said manipulable graphical icon at least one of a cross-hair and a marquee.

27. A method according to claim 25, further comprising a textual input step for selectively displaying a textual input icon requesting one or more of said input parameters, said textual input step including the step of responding to operator input to said textual input icon for generating values for one or more of said input parameters.

28. A method according to claim 25, wherein said textual input step includes the step of displaying said textual input icon as a dialog box.

29. A method according to any of claims 26 or 27, further comprising a run-time step for executing said program to invoke said selected machine vision analysis tool using said values for said one or more input parameters and, thereby, analyzing an image of an object.

30. A method for automated generation of a computer program for use in conjunction with machine vision analysis of an image, said method comprising A. a selection step for selecting, for inclusion in a computer program being created, a machine vision analysis tool to be invoked by that program, said machine vision analysis tool requiring input parameters, B. an imaging step for generating a candidate of an image upon which said machine vision analysis tool is to operate, C. a graphical input step for selectively displaying in connection with said candidate image a manipulable graphical icon, said graphical input step including the step of responding to operator manipulation of that icon for generating values for one or more of said input parameters, and D. an update step for generating a program signal representative of at least a portion of said computer program being generated, said portion including one or more syntactically correct programming statements for invoking; said selected machine vision analysis tool and for supplying thereto said values for said one or more input parameters.

31. A digital processing method according to claim 30, wherein said graphical input step includes the step of displaying as said manipulable graphical icon at least one of a cross-hair and a marquee.

32. A digital processing method according to claim 30, further comprising textual input step for selectively displaying a textual input icon requesting one or more of said input parameters, said textual input step including the step of responding to operator input to said textual input icon for generating values for one or more of said input parameters.

33. A digital processing method according to claim 30, wherein said textual input step includes the step of displaying said textual input icon as a dialog box.

34. A digital processing method according to any of claims 31 or 32 further comprising runtime step for executing said program to invoke said selected machine vision analysis tool using said values for said one or more input parameters and, thereby, analyzing an image of an object.

* * * * *

EX PARTE REEXAMINATION CERTIFICATE (4878th)
United States Patent
Silver et al.

(10) Number: US 5,481,712 C1
(45) Certificate Issued: Nov. 11, 2003

(54) METHOD AND APPARATUS FOR INTERACTIVELY GENERATING A COMPUTER PROGRAM FOR MACHINE VISION ANALYSIS OF AN OBJECT

(75) Inventors: William M. Silver, Medfield, MA (US); Samuel Druker, Brookline, MA (US); Philip Romanik, West Haven, CT (US); Carroll Arbogast, Needham, MA (US)

(73) Assignee: Cognex Corporation, Needham, MA (US)

Reexamination Request:
No. 90/005,982, Apr. 17, 2001

Reexamination Certificate for:
Patent No.: 5,481,712
Issued: Jan. 2, 1996
Appl. No.: 08/043,295
Filed: Apr. 6, 1993

(51) Int. Cl.$^7$ ................................................. G06F 9/44
(52) U.S. Cl. ...................... 717/109; 717/112; 717/113; 345/810
(58) Field of Search .......................... 717/107, 109–113, 717/125; 345/763, 810, 826, 866

(56) References Cited

U.S. PATENT DOCUMENTS

| | | | | |
|---|---|---|---|---|
| 4,831,580 A | * | 5/1989 | Yamada | 717/105 |
| 5,263,174 A | * | 11/1993 | Layman | 345/841 |
| 5,287,449 A | * | 2/1994 | Kojima | 345/161 |
| 5,327,568 A | * | 7/1994 | Maejima et al. | 717/147 |
| 5,410,648 A | * | 4/1995 | Pazel | 717/124 |
| 5,544,298 A | * | 8/1996 | Kanavy et al. | 345/804 |
| 5,600,778 A | * | 2/1997 | Swanson et al. | 345/762 |
| 5,790,863 A | * | 8/1998 | Simonyi | 717/113 |
| RE36,422 E | * | 11/1999 | Pazel | 717/125 |

OTHER PUBLICATIONS

Medina–Mora et al. (1981), An Incremental Programming Environment, IEEE Transactions on Software Eng. SE–7:472–482.*

Teitelbaum et al. (1981), The Cornell Program Synthesizer: A Syntax–Directed Programming Environment, Communications of the ACM 24:563–573.*

Cognex Corporation, *Introduction to On–Sight (beta)*, 1990 ("On–Sight Introduction").

Cognex Corporation, *On–Sight Technical Reference*, 1990 ("On–Sight Tech. Reference").

Cognex Corporation, *On–Sight Beta Software*, 1990 ("On–Sight Beta Software").

Cognex Corporation, *On–Sight Introduction Brochure*, 1990 ("On–Sight Brochure").

Thomas W. Reps and Tim Teitlebaum, *The Synthesizer Generator Reference Manual*, Third Edition, 1989 ("the Synthesizer Generator Manual").

(List continued on next page.)

*Primary Examiner*—Tuan Q. Dam

(57) ABSTRACT

A system for interactively generating a computer program for machine vision analysis insures that the program is correct by permitting the operator to make only syntactically correct modifications to the program. The system includes an element for storing the computer program being generated. A further element displays the program to the operator. A positioning element demarks a location of interest within the program. A menu element displays permissible programming modifications for the location of interest. The menu element incorporates in its display of permissible programming modifications statements for machine vision analysis of an object image, e.g., calls to machine vision subroutines and functions. To facilitate specification of input parameters to those subroutines and functions, the imaging element can generate a candidate image of the object upon which the machine vision analysis is to be run. A graphical input element displays over that candidate image a graphical icon that the operator can manipulate to specify the parameters. A textual input element can display an icon, e.g., a dialog box, prompting the operator to designate textually input parameters for the machine vision tool. An update element responds to the operator selection by appropriately modifying the stored program.

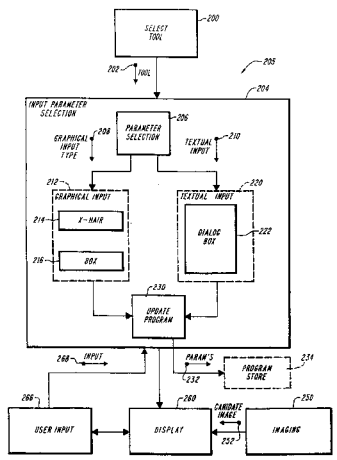

OTHER PUBLICATIONS

Thomas W. Reps and Tim Teitlebaum, *The Synthesizer Generator, A System for Constructing Language–Based Editors*, 1989 ("the Synthesizer Generator System").

Automatix, Inc., *Automatix Standard Application Package (ASAP),User's Manual*, Sep. 30, 1988 ("Automatix ASAP").

Automatix, Inc., *Image Analyst, Image Processing and Analysis on the Macintosh, User's Manual*, Jan. 1989 ("Image Analyst").

Automatix, Inc., *MacRail User Manual*, Oct. 19, 1988 ("MacRail").

Genesis Micro Software, *AutoMac III Macro Program, Owner's Manual*, (undated) ("AutoMac III").

BioScan, Inc., *BioScan OPTIMAS User's Manual & Reference*, May 1989 ("Optimas").

Graftek France, *Optilab User's Manual, Image Processing and Analysis Software for the Apple Macintosh II*, 1988 ("Optilab").

Graftek France, *Concept Vi User Manual*, 1992–1995 ("Concept Vi").

Graftek France, *Ultimage User's Manual* ("Ultimage").

NOESIS, *VISILOG User's Guide, 3.6 Release, An Introduction to the VISILOG Computer Vision Software*, Dec. 1990 ("Visilog").

Scott A. Solomon, *Visual Programming for a Machine Vision System*, Applied Machine Vision Conference, Jun. 1–4, 1992 ("Solomon").

Signal Analytics Corp., *IPLab User's Guide*, 1991 ("IPLab").

Yongmin Kim, *Medical Imaging IV: Image Capture and Display*, V. 1232, pp. 380–389, Feb. 4–5, 1990.

*DSP Design with DADisP*, Electronics World & Wireless World, Dec. 1989.

Dan Buxbaum, *Scientific/Industrial Image Processing on the Mac*, Advanced Imaging, Apr. 1991, pp. 22–31 ("Buxbaum").

Robert Morris, *Image processing on the Macintosh*, Computer, Aug. 1990.

Steven H. Hollinger, *A Six–Pack for the Mac*, ESD: The Electronic System Design Magazine, Jun. 1989.

*Ultimate and IPLab Spectrum, Two image processors reveal hidden scientific data in photographs*, MacUser, Jul. 1991.

*Image Analyst and Enhance*, MacUser, Jul. 1990.

Neil Kleinman, *The Macintosh as a Scientific/Industrial Image Processing Platform*, Advanced Imaging, Apr. 1991.

Media Cybernetics, *Image–Pro II, Image Processing System Version 2.0, Installation and Configuration Guide for the Data Translation DT2851/2858*, 1988.

Media Cybernetics, *Image–Pro II, Image Processing System Version 2.0, Extended Analysis Module*, 1989.

Media Cybernetics, *Image–Pro II, Image Processing System Version 2.0, HALO '88, Graphics Kernel System*, 1988.

Media Cybernetics, *Image–Pro II, Image Processing System Version 2.0, Developer's Toolkit Update*, 1989.

Media Cybernetics, *Image–Pro II, Image Processing System Version 1.0, Developer's Toolkit*, 1988.

Media Cybernetics, *Image–Pro II, Image Processing System Version 2.0, Guide to Operations*, 1988.

Media Cybernetics, *Image–Pro II, Image Editor*, 1988 (Image Pro II documents collectively referred to as "Image–Pro").

Ton Ten Kate, Richard Van Balen, Arnold Smeulders, Frans Groen, George Den Boer, *SCILAIM: A multi–level interactive image processing environment*, Pattern Recognition Letters, pp. 429–441, Jun. 1990.

Joe Morris, An Integrated approach to vision and control, pp. 165–169, (undated).

Ben Verwer, Frans Groen, Rob Ekkers, Robert Ellens, *Image Processing on Personal Computers*, IEEE, pp. 183–186, 1989.

Al Johnson, *Scientific Image Processing on the Macintosh II*, IEEE, pp. 179–182, 1989.

Perceptics, *TCL–Image User's Manual V4.0*, 1988.

Advanced Analysis and Image, Inc., *Bigmage Image Processing Version 1.0 User's Manual*, Dec. 1988.

Andrew Jackson, *Imaging Comes Through the DOS Window*, ESD Magazine, Apr. 1989.

Peter Lawson, *The Semper 6 Image Processing Language*, Microscopy and Analysis, Jul. 1988.

Data Translation, *PC Semper User Manual*, Feb. 1987.

Data Translation, *IRIStutor User Manual*, 1987.

Paul Otto, David Lau–Kee, Yasuo Kozato, *Design and implementation issues in VPA, a visual language for image processing*, Image Processing and Interchange, SPIE, vol. 1659, pp. 240–243 (1992).

Dave Bursky, *CMOS four–chip set processes images at 20MHz data rates*, Electronic Design, May 28, 1987.

Azriel Rosenfeld, *Computer Vision: Basic Principles*, Proceedings of the IEEE, vol. 76, No. 8, Aug., 1988.

W. Eric L. Crimson and Daniel P. Huttonlocher, *On the Sensitivity of the Hough Transform for Object Recognition*, IEEE Transactions on Pattern Analysis and Machine Intelligence, vol. 12, No. 3, Mar. 1990.

Stuart Gitlow, *X–Ray Vision*, MacGuide Magazine, vol. 2, issue 4, pp. 89–91 and 94, Jun. 1989.

Stuart Gitlow, *A Million Points of Light*, MacGuide Magazine, vol. 2, issue 4, pp. 91–93, Jun. 1989.

Tom Kent, *On–Sight Specification, A Graphical Programming Environment for Cognex Vision Processors, Version 0.2*, Jan. 31, 1990.

Cognex Corp., *On–Sight Next–Generation Machine Vision System*, May 1990.

Bob Ries, *Interoffice Memo re: On–sight Demo (Vision Show) Script—Rev. 1*, May 8, 1990.

Cognex Corp., *On–Sight Introductory Sales Training*, May 1990.

Cognex Corp., *Press Release re: Cognex Next–Generation Machine Vision System Combines Power with Ease–of–Use*, Jun. 4, 1990.

Cognex Corp., *Draft On–Sight Product Description*, (1990).

Cognex Corp., *On–Sight Technical Backgrounder*, (1990).

Tom Kent, *On–Sight Functional Specification, A Graphical Programming Environment for Cognex Vision Processors, Version 0.5*, Sep. 9, 1990.

Cognex Corp., *On–Sight Historical Calendar*, Feb. 1991.

Cognex Corp., *Cognex On–Sight Vision System Beta Test Agreement*, 1990.

Bob Ries, *Interoffice Memo re: Beta Action Item, New Decisions, Next Meeting*, Sep. 17, 1990.

*The Cognex On–Sight Vision System Video Script, Third Draft*, Nov. 3, 1990.

Cognex Corp., *On–Sight Vision System* (undated).

Cognex Corp., *Cognex On–Site, Preliminary Product Overview*, Dec. 1989.

Cognex Corp., *On–Sight Concept Presentation*, Apr. 1990.

Cognex Corp., *On–Site Project Information*, Feb. 9, 1990.

Cognex Corp., *On–Sight Program Update*, Oct. 1990.

Deposition Transcript of Cynthia Selby, Mar. 14, 2001.

Deposition Transcript of Carroll Arbogast, Mar. 29–30, 2001.

Page 1–22, 95–165; and 171–288 of the Deposition Transcript of Carroll Arbogast, Mar. 29–30, 2001.

Cynthia Selby, *Memo re: Final Plan for the International Automation Show*, May 29, 1990.

Cognex Corporation, *Agenda re Media Cybernetics Meeting*, Feb. 13, 1991.

*Agenda re Western Region User Conference*, Feb. 14, 1991.

Bob Ries, *Interoffice Memo re: On–Sight Technical Decisions/Review Schedule*, Feb. 18, 1991.

Cognex Corporation, *OnSight Design Specifications, Version 1.0*, Jul. 31, 1991.

Cognex Corporation, *OnSight Status Report for the month of Sep., 1991*, (undated).

Cognex Corporation, *News Release re Cognex Corp. Begins Beta Test of On–Sight Machine Vision System*, Sep. 25, 1990.

Cognex Corporation, *Tutorial.txt*, (undated).

Cognex Corporation, *Photographic Negatives*, Jun. 1990.

Cognex Corporation, *Photo re On–Sight Presentation,* Jun. 1990.

Cognex Corporation, *Photo re Cognex Booth at Interational Automation Show*, Jun. 1990.

Cognex Corporation, *Photo re On–Sight Introduction at Interational Automation Show*, Jun. 1990.

Cognex Corporation, *Photo re Cognex Booth at Assembly Tech Expo*, Sep. 1990.

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–34 are cancelled.

* * * * *